(12) United States Patent
Poeppel et al.

(10) Patent No.: US 9,811,086 B1
(45) Date of Patent: Nov. 7, 2017

(54) VEHICLE MANAGEMENT SYSTEM

(71) Applicant: Uber Technologies, Inc., San Francisco, CA (US)

(72) Inventors: Scott Poeppel, Pittsburgh, PA (US); Nicholas G. Letwin, Pittsburgh, PA (US); Sean J. Kelly, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/379,407

(22) Filed: Dec. 14, 2016

(51) Int. Cl.
*G05D 1/00* (2006.01)
*G07C 5/08* (2006.01)

(52) U.S. Cl.
CPC ......... *G05D 1/0088* (2013.01); *G07C 5/0808* (2013.01)

(58) Field of Classification Search
CPC ............................ G05D 1/0088; G07C 5/0808
USPC ...................................... 701/23, 2; 434/419
See application file for complete search history.

(56) References Cited

U.S. PATENT DOCUMENTS

| | | | |
|---|---|---|---|
| 8,065,342 B1 | 11/2011 | Borg et al. | |
| 2009/0186325 A1* | 7/2009 | Kumar | B61C 17/12 434/219 |
| 2013/0046421 A1* | 2/2013 | El Fassi | B61L 3/127 701/2 |
| 2015/0142248 A1* | 5/2015 | Han | G01C 21/3602 701/23 |
| 2015/0339928 A1* | 11/2015 | Ramanujam | G06Q 10/00 701/23 |
| 2015/0348335 A1* | 12/2015 | Ramanujam | G07C 5/006 701/23 |
| 2017/0024393 A1* | 1/2017 | Choksi | G06Q 40/12 |

* cited by examiner

*Primary Examiner* — Marthe Marc-Coleman
(74) *Attorney, Agent, or Firm* — Dority & Manning, P.A.

(57) ABSTRACT

Systems, methods, and vehicles for taking a vehicle out-of-service are provided. In one example embodiment, a method includes obtaining, by one or more computing devices on-board an autonomous vehicle, data indicative of one or more parameters associated with the autonomous vehicle. The autonomous vehicle is configured to provide a vehicle service to one or more users of the vehicle service. The method includes determining, by the computing devices, an existence of a fault associated with the autonomous vehicle based at least in part on the one or more parameters associated with the autonomous vehicle. The method includes determining, by the computing devices, one or more actions to be performed by the autonomous vehicle based at least in part on the existence of the fault. The method includes performing, by the computing devices, one or more of the actions to take the autonomous vehicle out-of-service based at least in part on the fault.

20 Claims, 10 Drawing Sheets

VEHICLE MANAGEMENT SYSTEM

FIELD

The present disclosure relates generally to addressing faults of an autonomous vehicle.

BACKGROUND

An autonomous vehicle can perceive its surroundings by using various sensor apparatuses and determining its position on the basis of the information associated with its surroundings. This can allow an autonomous vehicle to navigate without human intervention and, in some cases, even omit the use of a human driver altogether. However, the lack of in-person human oversight can potentially reduce the opportunity to address problems associated with the autonomous vehicle. While an autonomous vehicle may be monitored by a remote tracking system, such monitoring can be subject to potential communication latencies.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of taking a vehicle out-of-service. The method includes obtaining, by one or more computing devices on-board an autonomous vehicle, data indicative of one or more parameters associated with the autonomous vehicle. The autonomous vehicle is configured to provide a vehicle service to one or more users of the vehicle service. The method includes determining, by the one or more computing devices, an existence of a fault associated with the autonomous vehicle based at least in part on the one or more parameters associated with the autonomous vehicle. The method includes determining, by the one or more computing devices, one or more actions to be performed by the autonomous vehicle based at least in part on the existence of the fault. The method includes performing, by the one or more computing devices, one or more of the actions to take the autonomous vehicle out-of-service based at least in part on the fault.

Another example aspect of the present disclosure is directed to a computing system for taking a vehicle out-of-service. The system includes one or more processors on-board an autonomous vehicle. The system includes one or more memory devices on-board the autonomous vehicle. The one or more memory devices store instructions that when executed by the one or more processors cause the one or more processors to perform operations. The operations include obtaining data indicative of one or more parameters associated with the autonomous vehicle. The autonomous vehicle is configured to provide a vehicle service to one or more users of the vehicle service. The autonomous vehicle is associated with a status that indicates whether the autonomous vehicle is available or unavailable to provide the vehicle service. The operations include determining an existence of a fault associated with the autonomous vehicle based at least in part on a comparison of the one or more parameters associated with the autonomous vehicle to one or more thresholds. The operations include determining one or more actions to be performed by the autonomous vehicle based at least in part on the existence of the fault. At least one of the actions includes adjusting the status associated with the autonomous vehicle. The operations include adjusting the status associated with the autonomous vehicle to indicate that the autonomous vehicle is unavailable to provide the vehicle service based at least in part on the fault.

Yet another example aspect of the present disclosure is directed to an autonomous vehicle. The autonomous vehicle includes one or more systems on-board the autonomous vehicle and one or more processors on-board the autonomous vehicle. The autonomous vehicle includes one or more memory devices on-board the autonomous vehicle. The one or more memory devices store instructions that when executed by the one or more processors cause the one or more processors to perform operations. The operations include obtaining data indicative of one or more parameters associated with the autonomous vehicle. At least a portion of the data is provided by one or more of the systems on-board the autonomous vehicle. The autonomous vehicle is included in a plurality of vehicles associated with a service provider and the autonomous vehicle is configured to provide a vehicle service of the service provider to one or more users. The operations include determining an existence of a fault associated with the autonomous vehicle based at least in part on the one or more parameters associated with the autonomous vehicle. The operations include performing one or more actions to take the vehicle out-of-service based at least in part on the fault, such that the autonomous vehicle is unavailable to provide the vehicle service.

Other example aspects of the present disclosure are directed to systems, methods, vehicles, apparatuses, tangible, non-transitory computer-readable media, user interfaces, and memory devices for addressing a vehicle fault.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
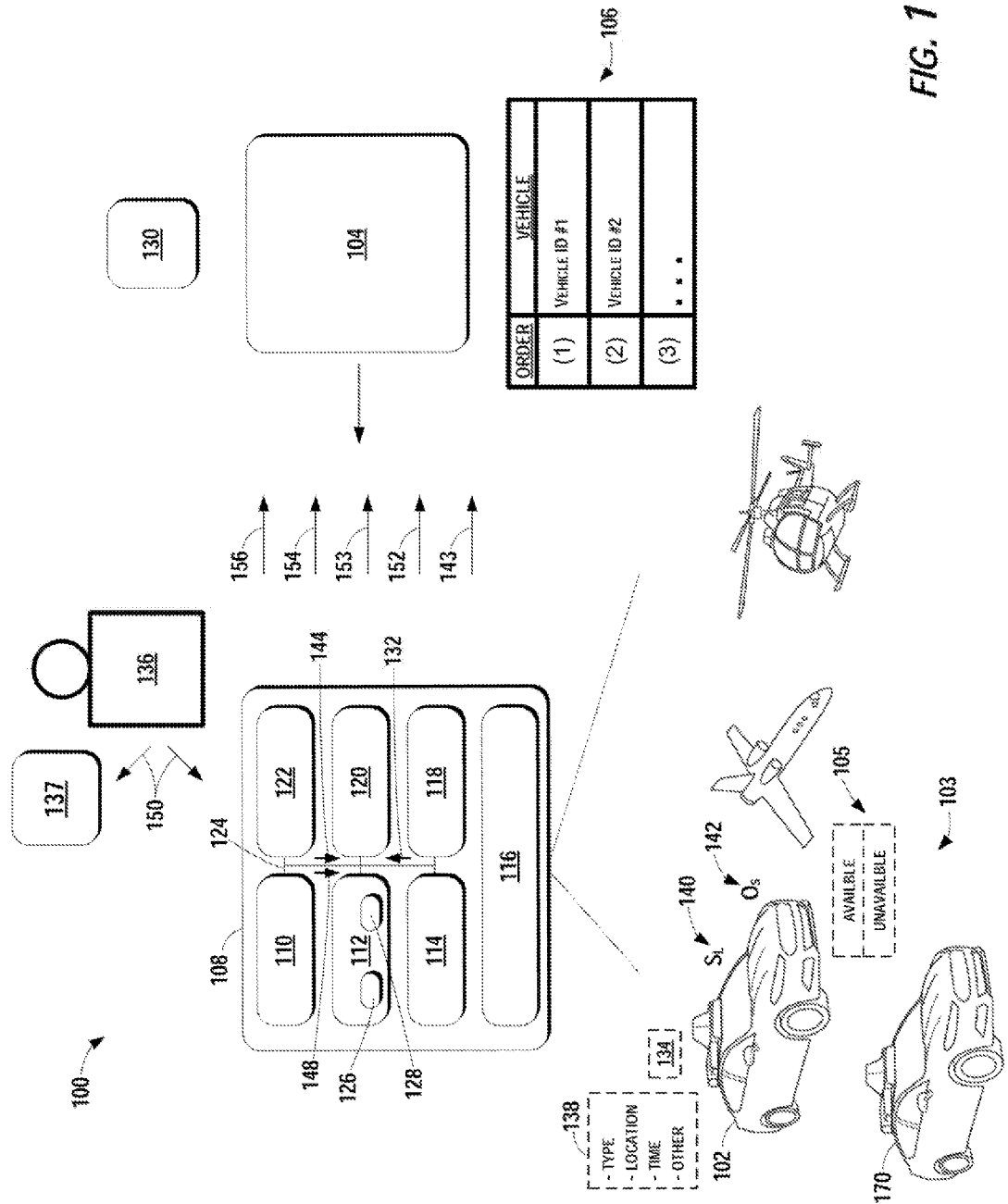
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to stopping and/or taking an autonomous vehicle out-of-service based on the detection of a fault associated with the vehicle. For instance, a service provider can use a fleet of vehicles to provide a vehicle service to a plurality of users. The service provider can be an entity that organizes, coordinates, manages, etc. vehicle services for users, such as transportation, courier, delivery, and/or other services. The fleet can include, for example, autonomous vehicles that can drive, navigate, operate, etc. with minimal and/or no interaction from a human driver, as will be further described. The service provider can coordinate the autonomous vehicles to provide the vehicle services of the service provider. An autonomous vehicle can include a vehicle computing system that can monitor one or more parameters associated with the vehicle. For example, the vehicle computing system can monitor the fuel level, charge level, engine conditions, tire pressure, available data storage in the on-board memory devices, and/or other health and maintenance data of the autonomous vehicle. The vehicle computing system can determine whether a fault associated with the vehicle exists based, at least in part, on the one or more parameters. For example, the vehicle computing system can determine that the vehicle's fuel level is too low because it is below a fuel threshold. Additionally, or alternatively, a current user of the vehicle can provide user input indicating the existence of a fault (e.g., smoke in the interior of the vehicle, urgent user health issue) via a user device. To address such faults, the vehicle computing system can cause the vehicle to take itself out-of-service (e.g., to travel to a service depot) and/or stop the motion of the vehicle (e.g., for roadside service). In this way, aspects of the present disclosure can allow the vehicle's on-board computing system to locally address faults associated with the vehicle.

More particularly, a computing system of an autonomous vehicle can include a variety of systems that are on-board the autonomous vehicle. For instance, an autonomous vehicle can include one or more data acquisition system(s) (e.g., sensors, image capture devices), an autonomy system (e.g., for controlling autonomous navigation), one or more human machine interface system(s) (e.g., physical interface buttons, user interfaces displayed via a display device), etc. One or more computing device(s) of the vehicle computing system (e.g., of a fault detection system) can communicate with such systems to obtain data indicative of one or more parameter(s) associated with the vehicle. As indicated above, the parameter(s) can include, for example, fuel level, charge level, engine conditions, tire pressure, conditions associated with the vehicle's interior, conditions associated with the vehicle's exterior (e.g., damage), available data storage in the on-board memory devices, and/or other health and maintenance data of the autonomous vehicle. In some implementations, the parameter(s) can be indicative of user input and/or can be related to a user of the vehicle. For example, the vehicle computing system can obtain (e.g., via the human-machine interface(s)) data indicative of user input that reports a fault (e.g., smoke in the interior, user panic attack).

The vehicle computing system can be configured to determine the existence of a fault associated with the vehicle. For instance, in some implementations, the vehicle computing system can determine the existence of a fault based, at least in part, on a comparison of one or more of the parameter(s) to one or more threshold(s). In some implementations, the thresholds can be static, pre-set thresholds. For example, the vehicle computing system can be configured to determine that a fault associated with the vehicle engine exists when the engine temperature exceeds a pre-set temperature threshold.

In some implementations, the threshold(s) can be dynamic thresholds that are adjusted by the vehicle computing system in real-time and/or near real-time. For example, the vehicle computing system can be configured to monitor the vehicle's parameters such that the autonomous vehicle is always capable of travelling to and arriving at a maintenance location (e.g., a service depot). To do so, the vehicle computing system can obtain data indicative of the geographic locations of one or more maintenance location(s).

In some implementations, the vehicle computing system can select an appropriate maintenance location based, at least in part, on the characteristics of the fault and/or the characteristics of the maintenance location. For example, the vehicle computing system can select an engine repair depot for an engine fault and/or select a computer maintenance depot for a computer-based fault. The vehicle computing system can determine a travel route to at least one of the maintenance location(s) (e.g., the most appropriate location) as well as one or more travel factor(s) (e.g., traffic, weather, construction) associated with the travel route to the maintenance location. The vehicle computing system can determine, in real-time and/or near real-time, the requisite levels of the parameter(s) (e.g., fuel, charge level of an energy storage device, available data storage) required for the autonomous vehicle to traverse the travel route and to arrive at the selected maintenance location. The vehicle computing system can set the threshold(s) to reflect these requisite levels to ensure that the vehicle can reach a maintenance location.

By way of example, for autonomous navigation, the data acquisition systems can continuously obtain data (e.g., image data) associated with the vehicle's surroundings. Such data can be used by the vehicle's autonomy system to navigate the vehicle in accordance with signage, lane markings, etc. while avoiding animals, objects, etc. As the data acquisition systems acquire data, the data is stored in the memory devices on-board the autonomous vehicle. Accordingly, the vehicle computing system can determine, in real-time and/or near real-time, a threshold amount of available data storage required for the vehicle to autonomously navigate to a maintenance location based, at least in part, on the travel route and/or travel factor(s). In the event that the amount of available data storage in the on-board memory device(s) approaches and/or falls below the threshold, the vehicle computing system can detect the existence of a fault (e.g., low data storage availability).

In some implementations, the vehicle computing system can determine an operational state of the vehicle based, at least in part, on the fault. The operational state can be indicative of whether the autonomous vehicle is in condition to provide a vehicle service to one or more user(s). For example, the operational state can indicate that the vehicle is in condition to continue to provide a vehicle service to one or more current user(s). Thus, the vehicle can finish providing the vehicle services (e.g., transporting current riders to their destination location) before taking itself out-of-service, travelling to a maintenance location, etc. In some implementations, the operational state can indicate that the vehicle is not in condition to provide the vehicle services. Thus, the vehicle computing system can reject any service requests and proceed to address the vehicle fault.

The vehicle computing system can determine one or more action(s) to help address the vehicle fault. For instance, in some implementations, at least one of the action(s) can include taking the vehicle out-of-service, such that the vehicle is unavailable to provide the vehicle services of the service provider. For instance, the autonomous vehicle can be associated with a status that indicates whether the autonomous vehicle is available or unavailable to provide the vehicle service. The vehicle computing system can adjust the status associated with the autonomous vehicle to indicate that the autonomous vehicle is unavailable to provide the vehicle service in response to detecting the fault. By way of example, the vehicle computing system can communicate with a remote operations computing system of the service provider to report the fault, indicate that the vehicle is unavailable to provide vehicle services, etc. In some implementations, the operations computing system can remove the vehicle from a service queue associated providing with the vehicle service and/or otherwise removing the vehicle from a pool of vehicles that are designated as available to provide a vehicle service to a user. As such, the vehicle will not be assigned to (and/or will not accept an assignment to) a user requesting vehicle services from the service provider. The vehicle computing system can also, or alternatively, provide one or more control command signals to one or more of the vehicle's on-board systems (e.g., the autonomy system) to cause the vehicle to travel to and arrive at a maintenance location (e.g., to address the fault).

In some implementations, at least one of the action(s) can include stopping the motion of the autonomous vehicle. The vehicle computing system can provide one or more control command signal(s) to one or more of the vehicle's on-board system(s) to perform such action(s). By way of example, the vehicle computing system can communicate with the human-machine interface(s) to obtain data indicative of user input (e.g., provided via a user device in the vehicle's interior). The user input can be indicative of a fault, such as, the presence of smoke and/or fire in the vehicle's interior (and/or a request to stop the vehicle). The vehicle computing system can determine that the fault exists based, at least in part, on this user input and that the fault is severe due to the type of fault (e.g., smoke, fire), its associated location (e.g., the vehicle's interior), and/or other characteristics. The vehicle computing system can, thus, determine that it is appropriate to stop the vehicle.

The vehicle computing system can determine a stopped position for the autonomous vehicle based, at least in part, on the fault and one or more travelling conditions (e.g., heading, speed, position, geographic location, road structure, or the like) associated with the vehicle. For example, in the event that the fault is severe and the vehicle is travelling on a road without a shoulder section, the vehicle computing system may select a stopped position in the current driving lane of the vehicle. However, in the event that the vehicle is traveling in a right-hand lane of a highway with a shoulder section, the vehicle computing system may select a stopped position out of the current driving lane (e.g., on the shoulder). The vehicle computing system can send one or more control command signal(s) (e.g., to the autonomy system, braking system) to decelerate the vehicle to the stopped position (e.g., in or out of the current driving lane). In this way, the vehicle computing system can control when and where the vehicle stops.

To pacify a current user of the autonomous vehicle, the vehicle computing system can coordinate one or more communication(s) with the current user. For instance, the vehicle computing system can notify the user of the fault via a display device (e.g., of a tablet associated with the vehicle, of a current user's mobile phone). This can provide the user with contextual information as to why the vehicle is stopping. In some implementations, the vehicle computing system can request that a human operator (e.g., associated with the service provider) communicate with a current user of the vehicle. If needed, the vehicle computing system can request that a different vehicle be assigned to provide the vehicle services to the user. Moreover, the vehicle computing system can request on-site maintenance of the autonomous vehicle, contact emergency authorities (e.g., ambulance), and/or cause the autonomous vehicle to travel to a maintenance location, if possible.

The system and methods described herein may provide a number of technical effects and benefits. For instance, the vehicle computing system can locally (e.g., on-board the vehicle) monitor vehicle parameters and determine the existence of a fault. Moreover, the autonomous vehicle can diagnose and address a fault without having to communicate with a remote operations computing system of the service provider. This can allow the autonomous vehicle to avoid potential latency issues that can arise when communicating with remote computing devices (e.g., due to poor network connectively, data upload/download). The autonomous vehicle can also avoid potential latency issues that can arise from remote computing device(s) processing multiple vehicle fault diagnosis requests (e.g., in the order they are received).

Furthermore, by addressing vehicle faults on-board the autonomous vehicle, the systems and methods of the present disclosure can limit the allocation of processing and storage resources of the operations computing system that are required for such analysis. The saved resources can be allocated to other functions of the operations computing systems, such as the processing of service requests, vehicle routing, etc. In this way, the systems and methods according to example aspects of the present disclosure have a technical effect of providing a computationally efficient approach to addressing vehicle faults while saving computational resources for other functions.

The systems and methods of the present disclosure also provide an improvement to vehicle computing technology, such as autonomous vehicle computing technology. For instance, the methods and systems enable the vehicle technology to locally detect and resolve faults associated with the autonomous vehicle. For example, the systems and methods can allow one or more computing device(s) on-board an autonomous vehicle to obtain data indicative of one or more parameter(s) associated with the autonomous vehicle, determine the existence of a fault associated with the autonomous vehicle based, at least in part, on the one or more parameters, and determine one or more action(s) to be performed by the autonomous vehicle based, at least in part, on the existence of the fault. In some implementations, the computing device(s) on-board an autonomous vehicle can perform one or more of the action(s) to take the vehicle out-of-service based, at least in part, on the fault, such that the vehicle is unavailable to provide the vehicle service. In some implementations, the computing device(s) on-board an autonomous vehicle can provide one or more control command signal(s) to one or more of the system(s) on-board the autonomous vehicle to perform one or more of the action(s) to facilitate stopping the motion of the autonomous vehicle. As such, the systems and methods of the present disclosure can improve the vehicle computing system's ability to address faults associated with the vehicle. For example, the systems and methods can improve the vehicle computing system by reducing the computational response time for addressing the determined faults (e.g., by avoiding the aforementioned latency issues of remote computing devices). This can increase the safety of the users of the vehicle. Moreover, by reducing the vehicle computing system's reliance on remote computing devices, the systems and methods of the present disclosure can reduce stress on the vehicle's communication interfaces, bandwidth usage, network traffic, etc.

Furthermore, the systems and methods of the present disclosure can improve the vehicle computing system's ability to ensure that the vehicle can reach a maintenance location. For example, the systems and methods can allow the one or more computing devices on-board the vehicle to obtain data indicative of a maintenance location (e.g. including its geographic location), determine a travel route to the maintenance location, obtain data indicative of one or more travel condition(s) associated with the travel route, and determine, in real-time, one or more threshold(s) based, at least in part, on the travel route and the travel condition(s). The threshold(s) can be indicative of one or more requisite level(s) of one or more parameters (e.g., fuel level, charge level, available data storage) required for the autonomous vehicle to traverse the travel route and to arrive at the maintenance location. In this way, the systems and methods can improve the ability of the vehicle computing system to determine whether and when it is appropriate for the vehicle to travel to a maintenance location. Accordingly, the vehicle computing system can better avoid vehicle break-down, damage, etc.

With reference now to the FIGS., example embodiments of the present disclosure will be discussed in further detail. FIG. 1 depicts an example system 100 according to example embodiments of the present disclosure. The system 100 can include a vehicle 102 and an operations computing system 104. The operations computing system 104 can be associated with a service provider that provides one or more vehicle service(s) to a plurality of users via a fleet of vehicles that includes, for example, the vehicle 102. The vehicle service(s) can include transportation services (e.g., rideshare services), courier services, delivery services, and/or other types of services.

The operations computing system 104 can include multiple components for performing various operations and functions. For example, the operations computing system 104 can include and/or otherwise be associated with one or more remote computing device(s) that are remote from the vehicle 102. The one or more remote computing device(s) can include one or more processor(s) and one or more memory device(s). The one or more memory device(s) can store instructions that when executed by the one or more processor(s) cause the one or more processor(s) to perform operations and functions (e.g., for the service provider).

For example, the operations computing system 104 can be configured to monitor and communicate with the vehicle 102 and/or its users to coordinate a vehicle service provided by the vehicle 102. To do so, the operations computing system 104 can manage a service queue 106 that pairs a vehicle (e.g., 102) with one or more user(s) to provide the user with one or more vehicle service(s) of the service provider. The vehicle 102 can be included in a plurality of vehicles 103 (e.g., a fleet of vehicles) associated with the service provider. Each vehicle in the plurality of vehicles 103 can be configured to provide the vehicle services of the service provider.

The service queue 106 can identify at least a subset of the plurality of vehicles 103 associated with the service provider that are available to provide the vehicle service. The service queue 106 can include a data structure which can be stored in a medium such as a cache and/or other memory resource. The service queue 106 can be an aggregation of data items, some of which can be used to identify a particular vehicle that is available to provide a vehicle service. A selection process can be associated with the service queue 106 in order to pair one or more user(s) with a vehicle that can provide the vehicle service requested by the user(s). The service queue 106 can be different from a maintenance queue utilized, for example, to coordinate maintenance of the vehicles in the fleet (e.g., at a service depot).

In some implementations, the operations computing system 104 may not use a service queue to pair vehicles to a user of the vehicle services. For example, a vehicle may be included in a pool of vehicles that are considered available to provide the vehicle services. A vehicle from the vehicle pool may be selected to provide vehicles services to a user based, at least in part, on one or more factor(s) (e.g., location, vehicle type, vehicle heading). Thus, in some implementations, the operations computing system 104 may not select a vehicle 102 to provide a vehicle service based on the vehicle's order/position in a service queue.

The vehicle 102 can be associated with a status 105 that indicates whether the vehicle 102 is available or unavailable to provide the vehicle service. The other vehicles in the plurality of vehicles 103 can also be associated with similar respective statuses. The vehicle 102 can be considered available to provide a vehicle service when the vehicle 102 is accepting and/or receiving one or more request(s) and/or assignment(s) to provide the vehicle service to one or more user(s). In some implementations, the vehicle 102 can be considered available to provide the vehicle service when the vehicle 102 is in the service queue 106 and/or actively accepting requests and/or assignments from the operations computing system 104. The vehicle 102 can be considered unavailable to provide a vehicle service when the vehicle 102 is not accepting one or more request(s) and/or assignment(s) to provide the vehicle service to one or more user(s). For example, the vehicle 102 can be considered unavailable to provide the vehicle service when the vehicle 102 is not in the service queue 106 and/or not accepting requests and/or assignments from the operations computing system 104 to provide the vehicle service to one or more user(s). As will be further described herein, the vehicle 102 can be configured to adjust the status 105 associated with the vehicle 102, such that the vehicle 102 can make itself available and/or unavailable to provide vehicle services to the user(s). An indication, record, and/or other data indicative of the status 105 can be stored locally in one or more memory device(s) of the vehicle 102. Additionally, or alternatively, the vehicle 102 can provide data indicative of the status 105 to the operations computing system 104, which can store an indication, record, and/or other data indicative of the status 105 in one or more memory device(s) associated with the operations computing system 104 (e.g., remote from the vehicle).

The operations computing system 104 can communicate with the vehicle 102 via one or more communications network(s). The communications network(s) can include various wired and/or wireless communication mechanisms (e.g., cellular, wireless, satellite, microwave, and radio frequency) and/or any desired network topology (or topologies). For example, the network(s) can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

The vehicle 102 can be a ground-based vehicle (e.g., an automobile), an aircraft, and/or another type of vehicle. The vehicle 102 can be an autonomous vehicle that can drive, navigate, operate, etc. with minimal and/or no interaction from a human driver. The autonomous vehicle 102 can be configured to operate in one or more mode(s) such as, for example, a fully autonomous operational mode, a semi-autonomous operational mode, a park mode, a sleep mode, etc. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 waits to provide a subsequent vehicle service, recharges between operational modes, etc.

The vehicle 102 can include a vehicle computing system 108. The vehicle computing system 108 can include various components for performing various operations and functions. For example, the vehicle computing system 108 can include one or more computing device(s) 110 on-board the vehicle 102. The computing device(s) 110 can include one or more processor(s) and one or more memory device(s), each of which are on-board the vehicle 102. The one or more memory device(s) can store instructions that when executed by the one or more processor(s) cause the one or more processor(s) to perform operations and functions, such as those taking the vehicle 102 out-of-service, stopping the motion of the vehicle 102, addressing vehicle faults, etc. as described herein.

The computing device(s) 110 can implement, include, and/or otherwise be associated with various other systems on-board the vehicle 102. The computing device(s) 110 can be configured to communicate with these other on-board systems of the vehicle 102. For instance, the computing device(s) 110 can be configured to communicate with one or more data acquisition system(s) 112, an autonomy system 114 (e.g., including a navigation system), one or more control system(s) 116, one or more human machine interface system(s) 118, other vehicle systems 120, and/or a communications system 122. The computing device(s) 110 can be configured to communicate with these systems via a network 124. The network 124 can include one or more data bus(es) (e.g., controller area network (CAN)), on-board diagnostics connector (e.g., OBD-II), and/or a combination of wired and/or wireless communication links. The computing device(s) 110 and/or the other on-board systems can send and/or receive data, messages, signals, etc. amongst one another via the network 124.

The data acquisition systems 112 can include various devices configured to acquire data associated with the vehicle 102. This can include data associated with one or more of the vehicle's system(s) (e.g., health data), the vehicle's interior, the vehicle's exterior, the vehicle's surroundings, the vehicle users, etc. The data acquisition systems 112 can include, for example, one or more image capture device(s) 126. The image capture device(s) 126 can include one or more camera(s), light detection and ranging (or radar) device(s) (LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The image capture device(s) 126 can be located in the interior and/or on the exterior of the vehicle 102. The one or more image capture device(s) 126 can be configured to acquire image data to be used for operation of the vehicle 102 in an autonomous mode. For example, the image capture device(s) 126 can acquire image data to allow the vehicle 102 to implement one or more machine vision technique(s) (e.g., to detect objects in the surrounding environment).

Additionally, or alternatively, the data acquisition systems 112 can include one or more sensor(s) 128. The sensor(s) 128 can include impact sensors, motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameter(s) associated with the vehicle 102 and/or relevant to the operation of the vehicle 102. The data acquisition systems 112 can include one or more sensor(s) 128 dedicated to obtaining data associated with a particular aspect of the vehicle 102, such as, the vehicle's fuel tank, engine, oil compartment, wipers, etc. The sensor(s) 128 can also, or alternatively, include sensor(s) associated with one or more mechanical and/or electrical components of the vehicle 102. For example, one or more of the sensor(s) 128 can be configured to detect whether a vehicle door, trunk, gas cap, etc. is in an open or closed position. In some implementations, the data acquired by the sensor(s) 128 can help detect other vehicles and/or objects, road conditions (e.g., curves, potholes, dips, bumps, changes in grade), measure a distance between the vehicle 102 and other vehicles and/or objects, etc.

The vehicle computing system 108 can also be configured to obtain map data. For instance, a computing device of the vehicle (e.g., within the autonomy system 114) can be configured to receive map data from one or more remote computing device(s). This can include computing device(s) of the operations computing system 104 and/or one or more other remote computing device(s) 130 (e.g., associated with a geographic mapping service provider). The map data can include two-dimensional and/or three-dimensional geographic map data associated with the area in which the vehicle was, is, intends to, and/or will be travelling.

The data acquired from the data acquisition system(s) 112, the map data, and/or other data can be stored in one or more memory device(s) on-board the vehicle 102. The on-board memory device(s) can have limited storage capacity. As such, the data stored in the memory device(s) may need to be periodically removed, deleted, and/or downloaded to another memory device (e.g., a database of the service provider). The computing device(s) 110 can be configured to monitor the memory device(s), and/or otherwise communicate with an associated processor, to determine how much available data storage is in the one or more memory device(s). Additionally, or alternatively, one or more of the other on-board system(s) (e.g., the autonomy system 114) can be configured to access the data stored in the one or more memory device(s).

The autonomy system 114 can be configured to allow the vehicle 102 to operate in a autonomous mode. For instance, the autonomy system 114 can obtain the data associated with the vehicle 102 (e.g., acquired by the data acquisition systems 112). The autonomy system 114 can also obtain the map data. The autonomy system 114 can control various functions of the vehicle 102 based, at least in part, on the acquired data associated with the vehicle 102 and/or the map data to implement the autonomous mode. For example, the autonomy system 114 can include various models to perceive road features, signage, and/or objects, people, animals, etc. based on the data acquired by the data acquisition system(s) 112, map data, and/or other data. In some implementations, the autonomy system 114 can include machine-learned models that use the data acquired by the data acquisition system(s) 112, the map data, and/or other data to help operate the autonomous vehicle. Moreover, the acquired data can help detect other vehicles and/or objects, road conditions (e.g., curves, potholes, dips, bumps, changes in grade, or the like), measure a distance between the vehicle 102 and other vehicles or objects, etc. The autonomy system 114 can be configured to predict the position and/or movement (or lack thereof) of such elements (e.g., using one or more odometry techniques). The autonomy system 114 can be configured to plan the motion of the vehicle 102 based, at least in part, on such predictions. The autonomy system 114 can implement the planned motion to appropriately navigate the vehicle 102 with minimal or no human intervention. For instance, the autonomy system 114 can include a navigation system configured to direct the vehicle 102 to a destination location. The autonomy system 114 can regulate vehicle speed, acceleration, deceleration, steering, and/or operation of other components to operate in an autonomous mode to travel to such a destination location.

The autonomy system 114 can determine a position and/or route for the vehicle 102 in real-time and/or near real-time. For instance, using acquired data, the autonomy system 114 can calculate one or more different potential routes (e.g., every fraction of a second). The autonomy system 114 can then select which route to take and cause the vehicle 102 to navigate accordingly. By way of example, the autonomy system 114 can calculate one or more different straight path(s) (e.g., including some in different parts of a current lane), one or more lane-change path(s), one or more turning path(s), and/or one or more stopping path(s). The vehicle 102 can select a path based, at last in part, on acquired data, current traffic factors, travelling conditions associated with the vehicle 102, etc. In some implementations, different weights can be applied to different criteria when selecting a path. Once selected, the autonomy system 114 can cause the vehicle 102 to travel according to the selected path.

The one or more control system(s) 116 of the vehicle 102 can be configured to control one or more aspect(s) of the vehicle 102. For example, the control system(s) 116 can control one or more access point(s) of the vehicle 102. The access point(s) can include features such as the vehicle's door locks, trunk lock, hood lock, fuel tank access, latches, and/or other mechanical access features that can be adjusted between one or more state(s), position(s), location(s), etc. For example, the control system(s) 116 can be configured to control an access point (e.g., door lock) to adjust the access point between a first state (e.g., lock position) and a second state (e.g., unlocked position). Additionally, or alternatively, the control system(s) 116 can be configured to control one or more other electrical feature(s) of the vehicle 102 that can be adjusted between one or more state(s). For example, the control system(s) 116 can be configured to control one or more electrical feature(s) (e.g., hazard lights, microphone) to adjust the feature between a first state (e.g., off) and a second state (e.g., on). The control system(s) 116 can also control the motion of the vehicle 102 (e.g., steering, speed, braking, acceleration). The control system(s) 116 can receive signals from the autonomy system(s) 114 indicating the appropriate/planned motion of the vehicle 102.

The human machine interface system(s) 118 can be configured to allow interaction between a user (e.g., human), the vehicle 102 (e.g., the vehicle computing system 108), and/or a third party (e.g., an operator associated with the service provider). The human machine interface system(s) 118 can include a variety of interfaces for the user to input and/or receive information from the vehicle computing system 108. For example, the human machine interface system(s) 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The human machine interface system(s) 118 can include one or more input device(s) (e.g., touchscreens, keypad, touchpad, knobs, buttons, sliders, switches, mouse, gyroscope, microphone, other hardware interfaces) configured to receive user input. The human machine interface(s) 118 can also include one or more output device(s) (e.g., display devices, speakers, lights) to receive and output data associated with the interfaces.

The other vehicle systems 120 can be configured to control and/or monitor other aspects of the vehicle 102. For instance, the other vehicle systems 120 can include software update monitors, an engine control unit, transmission control unit, the on-board memory devices, etc. The computing device(s) 110 can be configured to communicate with the other vehicle systems 120 to receive data and/or to send to one or more signals. By way of example, the software update monitors can provide, to the computing device(s) 110, data indicative of a current status of the software running on one or more of the on-board systems and/or whether the respective system requires a software update.

The communications system 122 can be configured to allow the vehicle computing system 108 (and its computing device(s) 110) to communicate with other computing devices. In some implementations, the vehicle computing system 108 can use the communications system 122 to communicate with one or more user device(s) over the network(s). In some implementations, the communications system 122 can allow the computing device(s) 110 to communicate with one or more of the system(s) on-board the vehicle 102. The vehicle computing system 108 can use the communications system 122 to communicate with the operations computing system 104 and/or one or more other remote computing device(s) 130 over the network(s) (e.g., via one or more wireless signal connections). The communications system 122 can include any suitable components for interfacing with one or more network(s), including for example, transmitters, receivers, ports, controllers, antennas, or other suitable components that can help facilitate communication with one or more remote computing device(s) that are remote from the vehicle 102.

The computing device(s) 110 on-board the vehicle 102 can obtain data 132 indicative of one or more parameter(s) associated with the vehicle 102. The parameter(s) can include information, such as health and maintenance information, associated with the vehicle 102, the vehicle computing system 108, one or more of the on-board system(s), etc. For example, the one or more parameter(s) can include fuel level, engine conditions, tire pressure, conditions associated with the vehicle's interior, conditions associated with the vehicle's exterior, mileage, time until next maintenance, time since last maintenance, available data storage in the on-board memory devices, a charge level of an energy storage device in the vehicle 102, current software status, needed software updates, and/or other heath and maintenance data of the vehicle 102.

At least a portion of the data 132 indicative of the parameter(s) can be provided via one or more of the system(s) on-board the vehicle 102. The computing device(s) 110 can be configured to request the data 132 from the on-board system(s) on a scheduled and/or as-needed basis. In some implementations, one or more of the on-board system(s) can be configured to provide data 132 indicative of one or more parameter(s) to the computing device(s) 110 (e.g., periodically, continuously, as-needed, as requested). By way of example, the data acquisitions system(s) 112 can provide a parameter indicative of the vehicle's fuel level and/or the charge level in a vehicle energy storage device. In some implementations, one or more of the parameter(s) can be indicative of user input. For example, the human machine interface(s) 118 can receive user input 150 (e.g., via a user interface displayed on a display device in the vehicle's interior). The human machine interface(s) 118 can provide data indicative of the user input 150 to the computing device(s) 110. In some implementations, a user device 137 associated with the user 136 can receive user input 150 and can provide data indicative of the user input 150 to the computing device(s) 110. The computing device(s) 110 can obtain the data indicative of the user input 150 from the user device 137 (e.g., via a wireless communication).

The computing device(s) 110 can be configured to determine an existence of a fault 134 associated with the vehicle 102 based, at least in part, on the one or more parameter(s) associated with the vehicle 102. The fault 134 can be a condition associated with the vehicle 102 (and its users) that is, or potentially is, unsafe, problematic, abnormal, damaging, etc. to the vehicle 102 and/or one or more user(s) 136 (e.g., current, assigned, potential users) of the vehicle 102. In some implementations, the fault 134 can be associated with the vehicle 102 in that it is a fault of a component of the vehicle 102 (and/or a user 136 of the vehicle), not based on an object, animal, human, etc. detected in the vehicle's surroundings. In some implementations, the fault 134 can be a condition that needs to be addressed to prevent and/or mitigate harm to the vehicle 102 and/or its user(s) 136.

The computing device(s) 110 can be configured to determine one or more characteristic(s) 138 of the fault 134. For instance, the vehicle 102 can determine the type of fault (e.g., low fuel), the location of the fault (e.g., fuel tank), the time at which the fault occurred and/or was determined, its potential effect on the vehicle 102 and/or a user 136, and/or other characteristic(s) associated with the fault 134.

Figure 2:
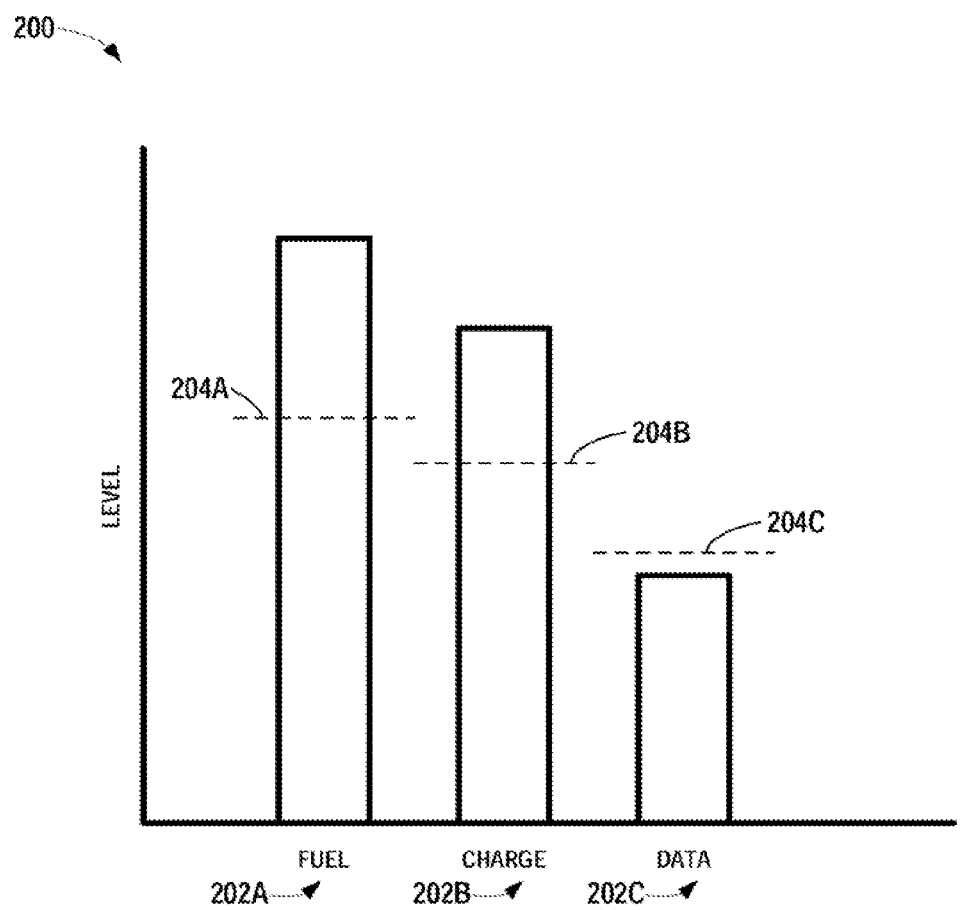
FIG. 2 illustrates a representation of example vehicle parameters and thresholds according to example embodiments of the present disclosure.

In some implementations, the computing device(s) 110 can be configured to determine the existence of a fault 134 associated with the vehicle 102 based, at least in part, on a comparison of the one or more parameter(s) associated with the vehicle 102 to one or more threshold(s). For example, FIG. 2 illustrates a graphical representation 200 of vehicle parameters 202A-C and thresholds 204A-C according to example embodiments of the present disclosure. FIG. 2 shows certain parameters and thresholds for example and discussion purposes and is not meant to be limiting. One of ordinary skill in the art would understand that the parameters and thresholds shown and discussed herein can include fewer, additional, different, and/or modified parameters and/or thresholds than shown and discussed.

As shown, the parameter(s) 202A-C can reflect a variety of information associated with the vehicle 102. For example, the parameter(s) 202A-C can include at least one parameter 202A indicative of a fuel level of the vehicle 102, at least one parameter 202B indicative of a charge level of an energy storage device on-board the vehicle 102, and/or at least one parameter 202C indicative of an amount of available data storage in one or more memory device(s) on-board the vehicle 102. The parameter(s) 202A-C can be indicative of the current level of those respective features of the vehicle 102.

The threshold(s) 204A-C can be indicative of certain threshold levels of the parameter(s) 202A-C. For example, the threshold(s) 204A-C can include a fuel level threshold 204A, a charge level threshold 204B, and threshold 204C indicative of a threshold amount of available data storage. The threshold(s) 204A-C can be set by the operations computing system 104, the vehicle 102, and/or an individual/entity associated with the vehicle 102 and/or the service provider. In some implementations, one or more of the threshold(s) 204A-C can be a static threshold (e.g., a constant threshold that does not change). In some implementations, one or more of the threshold(s) can be a dynamic threshold (e.g., that changes) and/or can be determined in real-time and/or near real-time. For example, the computing device(s) 110 can be configured to determine (e.g., in real-time and/or near real-time) one or more threshold(s) 204A-C such that the vehicle 102 can always travel to and arrive at a maintenance location (e.g., to address a fault).

Figure 3:
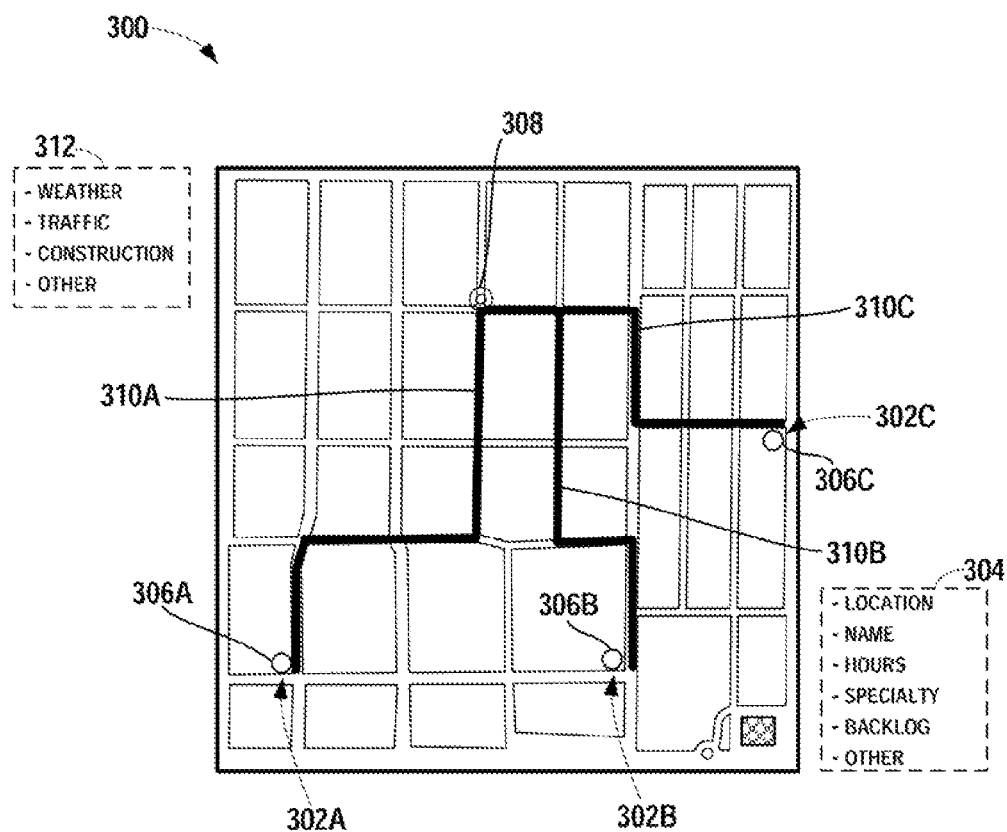
FIG. 3 illustrates a representation of example maintenance locations according to example embodiments of the present disclosure.

FIG. 3 illustrates a graphical representation 300 of a plurality of maintenance locations 302A-C according to example embodiments of the present disclosure. The computing device(s) 110 on-board the vehicle 102 can obtain data indicative of the plurality of maintenance locations 302A-C. The data can be obtained via one or more remote computing device(s) (e.g., 104, 130) that are remote from the vehicle 102. The data can be indicative of one or more characteristic(s) 304 of each of the maintenance locations 302A-C in the plurality of maintenance locations 302A-C. For example, the data indicative of the maintenance location(s) 302A-C can be indicative of at least a geographic location 306A-C of the respective maintenance location 302A-C. Additionally, or alternatively, the characteristic(s) 304 of a maintenance location can include its name, type of maintenance provided, other specialties, hours of operation, availability to provide maintenance to the vehicle 102 (e.g., backlog, current reservations), and/or other characteristic(s) associated with the respective maintenance location 302A-C. In some implementations, the computing device(s) 110 on-board the vehicle 102 can be configured to identify one or more maintenance location(s) 302A-C from a plurality of maintenance location(s) 302A-C based, at least in part, on one or more characteristic(s) 304 of the maintenance location(s) 302A-C. By way of example, the computing device(s) 110 can identify the maintenance location(s) 302A-C that are within proximity of a current location 308 of the vehicle 102, that are currently open, and/or have maintenance availability.

The computing device(s) 110 can be configured to determine a travel route 310A-C to a maintenance location 302A-C. In some implementations, the computing device(s) 110 can determine a respective travel route to each of the respective maintenance locations 302A-C. In some implementations, the computing device(s) 110 can determine one or more travel route(s) to one or more of the maintenance location(s) 302A-C. A travel route 310A-C can be a route from the current location 308 (and/or a future location) of the vehicle 102 to a geographic location 306A-C of the respective maintenance location 302A-C. The vehicle 102 can be configured to travel (e.g., autonomously navigate) along the travel route 310A-C to arrive at a maintenance location 302A-C. Moreover, the computing device(s) 110 can be configured to determine one or more travel factor(s) 312 (e.g., current traffic, historical traffic patterns, weather, construction, other conditions) associated with a respective travel route 310A-C.

The computing device(s) 110 can be configured to determine (e.g., in real-time) a threshold 204A-C based, at least in part, on the travel route 310A-C and the one or more travel factor(s) 312. For instance, the computing device(s) 110 can determine how much fuel, electric charge, and/or data is needed to arrive at a maintenance location 302C. This maintenance location 302C can be the closest maintenance location to the current location 308 of the vehicle 102 and/or the most appropriate location based, at least in part, on one or more of the characteristic(s) 304 of the maintenance location 302C (e.g., a maintenance location that is open and available). The computing device(s) 110 can determine (e.g., in real-time and/or near real-time) one or more of the threshold(s) 204A-C such that the threshold(s) are indicative of one or more requisite level(s) of one or more of the parameter(s) 202A-C required for the vehicle 102 to travel to and arrive at a maintenance location 302C.

The computing device(s) 110 can be configured to use the dynamic, real-time threshold(s) to determine the existence of the fault 134. For example, the vehicle 102 can include one or more image capture device(s) 126 configured to acquire image data (e.g., associated with the vehicle's surroundings) to be used for operation of the vehicle 102 in an autonomous mode. Such image data can be used by the autonomy system 114 to navigate the vehicle 102 in accordance with signage, lane markings, etc. As the image capture device(s) 126 acquire the image data, the image data can be stored in one or more memory device(s) on-board the vehicle 102. The computing device(s) 110 can obtain data indicative of a parameter 202C associated with the memory device(s). For example, the parameter 202C can be indicative of an amount of available data storage in one or more of the memory device(s) on-board the vehicle 102. Accordingly, the computing device(s) 110 can determine, in real-time and/or near real-time, a threshold 204C indicative of a threshold amount of available data storage based, at least in part, on the travel route 310C to the maintenance location 302C and/or travel factor(s) 312 (e.g., traffic) associated with the travel route 310C. The threshold amount of available data storage can be based, at least in part, on the amount of data storage required for the vehicle 102 to travel to and arrive at the geographic location 306C of the maintenance location 302C (e.g., via the travel route 310C, given the travel factor(s) 312). In the event that the amount of available data storage in the on-board memory device(s) approaches and/or falls below the threshold 204C, the computing device(s) 110 can determine the existence of a fault 134 associated with storing the image data (e.g., low data storage availability). In this way, the computing device(s) 110 can ensure that the vehicle 102 can, at least, travel to the maintenance location 302C in case of a fault.

In some implementations, the threshold(s) 204A-C can change based, at least in part, on the location of the vehicle 102. For example, as the location of the vehicle 102 changes, the maintenance location that is closest to the vehicle 102 may also change. As such, the computing device(s) 110 can adjust the threshold(s) 204A-C as the vehicle's location changes to ensure that the vehicle 102 can, at least, travel to the closest (and/or most appropriate) maintenance location, in case of a fault.

Returning to FIG. 1, in some implementations, the computing device(s) 110 can be configured to determine a level of severity 140 of the fault 134 based, at least in part, on one or more characteristic(s) 138 of the fault 134 (e.g., type, potential risk, location on vehicle). For example, the computing device(s) 110 can determine that the level of severity 140 of a fault, such as a stuck window, is low given the type of fault and the potential risk to the vehicle 102 and/or a user 136 of the vehicle 102. In another example, the computing device(s) 110 can determine that the level of severity 140 of a fault, such a fire in the vehicle's interior, is higher given the type of fault (e.g., smoke, fire), its associated location (e.g., the vehicle's interior), and/or other characteristics. In this way, the vehicle computing system 108 can improve its ability to take suitable measures to address the fault, given its level of severity.

The computing device(s) 110 can be configured to determine an operational state 142 of the vehicle 102 based, at least in part, on the level of severity of the fault 140. The operational state 142 can be indicative of whether the vehicle 102 is in condition to provide a vehicle service to the one or more user(s) 136. For example, the operational state 142 can indicate that the vehicle 102 is in condition to provide the vehicle service to one or more user(s) 136 of the vehicle 102 (e.g., for a minor fault, a stuck window). In some implementations, the operational state 142 can indicate that the vehicle 102 can provide a vehicle service to a current user 136 of the vehicle 102 (e.g., transport the rider to a destination location). In some implementations, the operational state 142 can indicate that the vehicle 102 can selectively provide vehicle services to a user of the vehicle 102. For example, the vehicle 102 can provide a transportation service to a user travelling in the direction of a maintenance location and/or can deny providing a transportation service to a user travelling away from the direction of a maintenance location. In some implementations, the operational state 142 can indicate that the vehicle 102 is not in condition to provide the vehicle service to the one or more user(s) 136 (e.g., for more severe faults).

The computing device(s) 110 can be configured to determine one or more action(s) to be performed by the vehicle 102 based, at least in part, on the existence of the fault 134. For instance, the computing device(s) 110 can perform one or more of the action(s) to take the vehicle 102 out-of-service based, at least in part, on the fault 134. When out-of-service, the vehicle 102 can be unavailable to provide one or more vehicle service(s) (e.g., of the service provider).

For instance, at least one of the actions can include adjusting the status 105 associated with the vehicle 102. The computing device(s) 110 can adjust the status 105 associated with the vehicle 102 to indicate that the vehicle 102 is unavailable to provide the vehicle service based, at least in part, on the fault 134. To do so, the computing device(s) 110 can adjust an indication, record, and/or other data associated with the status 105 to indicate that the vehicle 102 is unavailable to provide the vehicle service. The computing device(s) 110 can provide, to one or more remote computing device(s) (e.g., 104, 130) that are remote from the vehicle 102, data 143 indicating that the vehicle 102 is unavailable to provide the vehicle service (e.g., transportation, courier, deliver) and/or indicating that the vehicle 102 is to be removed from the service queue 106 associated with the vehicle service. In some implementations, the data 143 can be indicative of one or more characteristic(s) of the fault 134.

The operations computing system 104 can remove the vehicle 102 from the service queue 106 associated with the vehicle service (and/or a pool of available vehicles). Additionally, or alternatively, the operations computing system 104 can adjust an indication, record, and/or other data associated with the status 105 to indicate that the vehicle 102 is unavailable to provide the vehicle service. A computing device associated with the service provider (e.g., of the operations computing system 104) may not provide the vehicle 102 with one or more request(s) for the vehicle service (e.g., to transport a user) when the vehicle 102 is out-of-service and/or when the status 105 associated with the vehicle 102 indicates that the vehicle 102 is unavailable to provide the vehicle service. Additionally, or alternatively, the vehicle 102 may not accept and/or receive requests for the vehicle service when the vehicle 102 is out-of-service and/or the status 105 associated with the vehicle 102 indicates that the vehicle 102 is unavailable to provide the vehicle service. As such, the vehicle 102 will not be assigned to (and/or will not accept an assignment to) a user requesting vehicle services from the service provider. According, the vehicle 102 can take itself out-of-service in response to the determination of the existence of the fault 134.

The action(s) can also, or alternatively, include a variety of other tasks that the vehicle 102 can perform based, at least in part, on the fault 134. For example, the action(s) can include sending data to the operations computing system 104, travelling to and arriving at a maintenance location 302C (e.g., via the travel route 310C), contacting a maintenance location 302C (e.g., to inform of estimated time of arrival, to enter maintenance queue), to activate reserve data storage, power resources, etc. In some implementations, the computing device(s) 110 can provide one or more control command signal(s) 144 to one or more of the system(s) on-board the vehicle 102 to perform one or more of the action(s).

In some implementations, the computing device(s) 110 can determine the one or more action(s), based at least in part, on the operational state 142 of the vehicle 102. For example, the operational state 142 can indicate that the vehicle 102 is not in condition to provide the vehicle services due to the fault 134. As such, the vehicle computing system 102 can reject any service requests and proceed to address the fault 134. In some implementations, to address the fault, the computing device(s) 110 can provide one or more control command signal(s) 144 to one or more of the system(s) on-board the vehicle 102 (e.g., navigation system) to cause the vehicle 102 to travel to and arrive at a maintenance location 302C.

In another example, the operational state 142 can indicate that the vehicle 102 is in condition to provide the vehicle service to one or more current user(s) 136 of the vehicle 102 (e.g., due to a minor fault, stuck window). One or more of the system(s) on-board the vehicle 102 (e.g., the autonomy system 114) can perform one or more of the action(s) (e.g., navigation actions) to cause the vehicle 102 to complete the vehicle service provided to the one or more current user(s) 136 (e.g., to take the user(s) of a rideshare service to a destination location), before travelling to the maintenance location 302C (e.g., to fix a stuck window). The vehicle 102 can complete the vehicle service before or after taking the vehicle 102 out-of-service. For example, the computing device(s) 110 can adjust the status 105 associated with the vehicle 102 to indicate that the autonomous vehicle is unavailable to provide the vehicle service, before or after dropping-off the user(s) at a destination location.

In yet another example, the operational state 142 can indicate that the vehicle 102 can selectively provide a vehicle service to a user 136 such that the vehicle 102 is still travelling to a maintenance location 302C while providing the vehicle service. One or more of the on-board system(s) can perform action(s) such that the vehicle 102 only accepts service requests that would cause the vehicle 102 to travel, at least generally, in the direction of a maintenance location 302C and/or deny service requests that would cause the vehicle 102 to travel away from a maintenance location 302C. In this way, the vehicle 102 can still travel to address a fault 134, without unnecessarily using its resources.

The vehicle 102 can travel to and arrive at the maintenance location 302C to have the fault addressed. In some implementations, the computing device(s) 110 can cause the vehicle 102 to enter a service mode. The service mode can allow a maintenance worker (e.g., computer technician, vehicle mechanic) to provide maintenance to the vehicle 102 to address the fault.

In some implementations, at least one of the action(s) can include stopping a motion of the vehicle 102. The one or more action(s) can include, for example, applying the brakes of the vehicle 102, changing vehicle position (e.g., to pull-over to a shoulder, median of the road), activating hazard lights, inflating airbags, unlocking the vehicle doors upon immobilization, etc. In some implementations, the computing device(s) 110 can determine the one or more action(s) based, at least in part, on the level of severity 140 associated with the fault 134, as described herein. The computing device(s) 110 can provide one or more control command signal(s) 148 to one or more of the system(s) on-board the vehicle 102 to perform one or more of the action(s) to facilitate stopping a motion of the vehicle 102 in response to the existence of the fault 134.

By way of example, the computing device(s) 110 can communicate with one or more of the human-machine interface system(s) 118 to obtain data 132 indicative of one or more parameter(s). The parameter(s) can include data indicative of a user input 150 associated with the fault 134. For example, a user 136 of the vehicle 102 can provide user input via one or more interface(s) (e.g., user interface, physical interface) of the human-machine interface system(s) 118 and/or via a user device 137 associated with the user 136. The user input 150 can be indicative of the presence of fire in the vehicle's interior, smoke emitting from the vehicle's engine, etc. Additionally, or alternatively, the user input 150 can be indicative of a user-initiated request to stop the vehicle 102 (e.g., due to a user panic attack).

The computing device(s) 110 can determine the existence of the fire, smoke, user problem, etc. based, at least in part, on the user input 150. The computing device(s) 110 can determine one or more action(s) to be performed by the vehicle 102 based, at least in part, on the fault 134. For example, the computing device(s) 110 can determine that the vehicle 102 should decelerate to a stopped position so that the smoke, fire, user's problem, etc. can be properly addressed.

Figure 4:
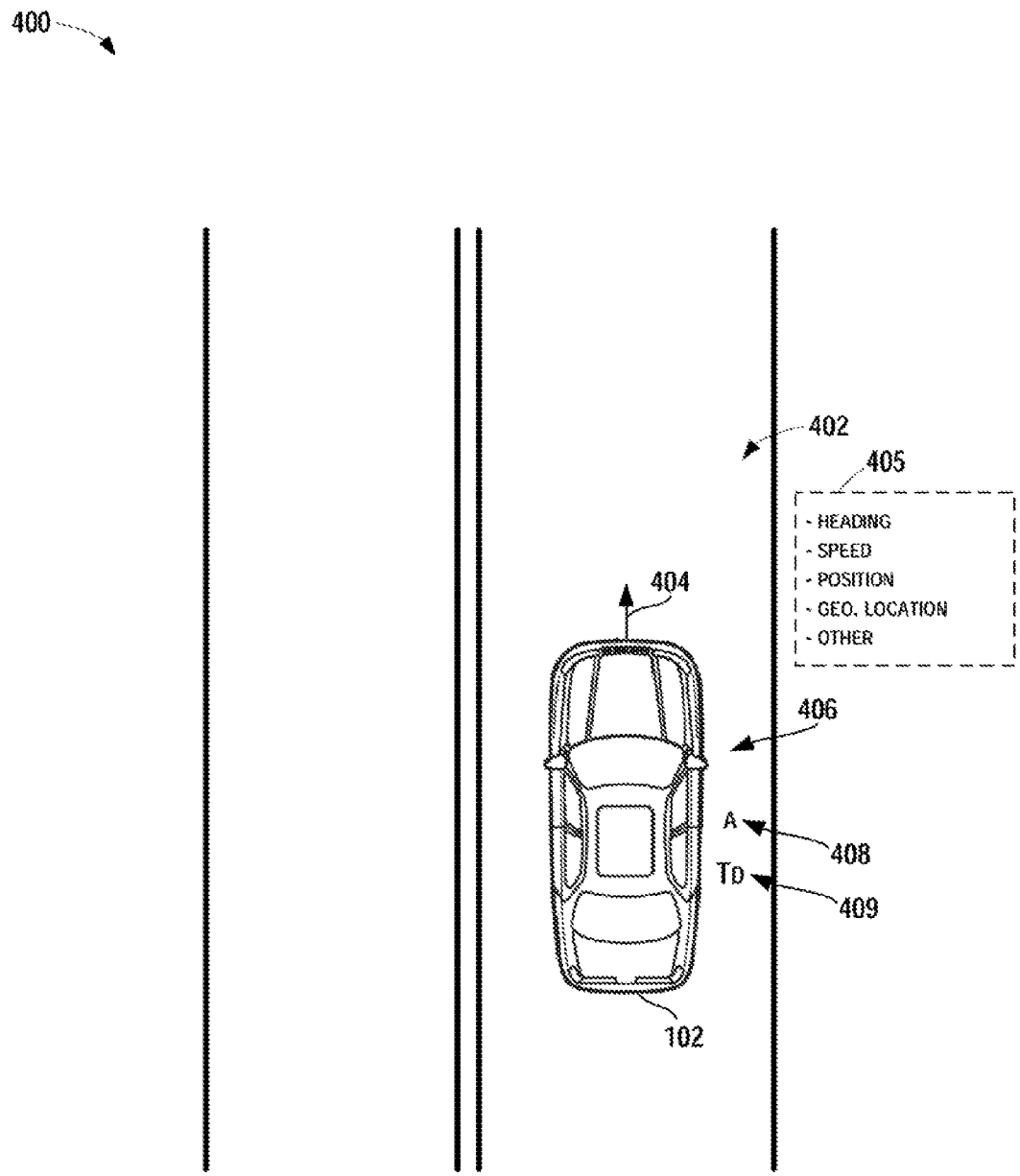
FIG. 4 illustrates a representation of an example vehicle in a driving lane according to example embodiments of the present disclosure.

FIG. 4 illustrates a representation 400 of the vehicle 102 in a driving lane 402 according to example embodiments of the present disclosure. The vehicle 102 can be travelling (e.g., in an autonomous mode) according to a motion 404 (e.g., a velocity vector). The motion 404 of the vehicle 102 can be controlled by the system(s) (e.g., autonomy system 114, control system(s) 116) on-board the vehicle 102. The vehicle 102 can travel in accordance with the motion 404 while providing a vehicle service (e.g., a transportation service) to one or more user(s) 136.

One or more of the on-board systems of the vehicle 102 can be configured to determine a stopped position for the vehicle 102 based, at least in part, on the fault (e.g., its characteristic(s) 138) and one or more travelling condition(s) 405 associated with the vehicle 102. The travelling condition(s) 405 can include vehicle heading, speed, position, geographic location, road/lane structure, surroundings (e.g., buildings, objects, humans), etc. For example, as indicated above, the autonomy system 114 can continuously calculate different paths for the vehicle 102 (e.g., based on differently weighted criteria). Upon detection of the existence of a fault 134, the autonomy system 114 can change the weighting so that the autonomy system 114 can choose a path based, at least in part, on the existence of the fault 134.

Figure 5:
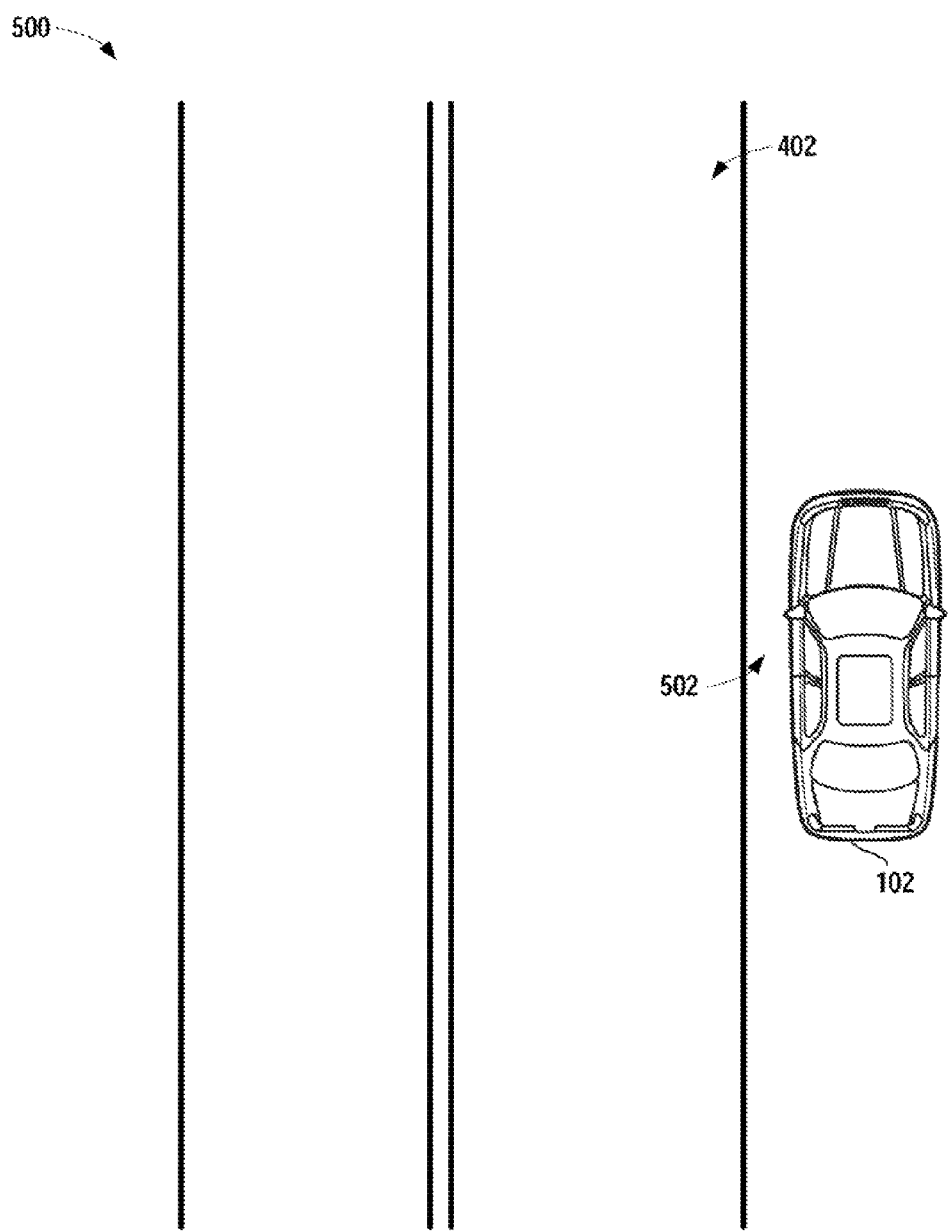
FIG. 5 illustrates a representation of an example vehicle out of a driving lane according to example embodiments of the present disclosure.

For instance, as shown in FIG. 4, the stopped position 406 of the vehicle 102 can be in a driving lane 402 (e.g., current driving lane) of the vehicle 102. The system(s) (e.g., autonomy system, brake control system) can cause the vehicle 102 to reach a stopped position 406 in a driving lane when the level of severity 140 of the fault 134 is high. In some implementation(s), as shown in the representation 500 of FIG. 5, the stopped position 502 of the vehicle 102 can be out of a driving lane 402 (e.g., current driving lane) of the vehicle 102. For example, the vehicle 102 can be in a stopped position 502 on the shoulder, median, etc. of a travelway, when there is enough time to reach such a position.

The computing device(s) 110 can provide one or more control command signal(s) 148 to one or more of the system(s) on-board the vehicle 102 to facilitate stopping the motion 404 of the vehicle 102 in response to the existence of the fault 104. In some implementations, to facilitate stopping the motion 404 of the vehicle 102, one or more system(s) on-board the vehicle 102 (e.g., autonomy system, braking system) can cause at least a change in the direction of the vehicle 102 such that the vehicle 102 can reach the selected stopped position (e.g., 406, 502). The one or more system(s) on-board the vehicle 102 can also cause at least a deceleration of the vehicle 102 until the vehicle 102 is in the stopped position (e.g., 406, 502).

Returning to FIG. 4, in some implementations, a rate of deceleration 408 of the vehicle 102 can be based, at least in part, on the level of severity 140 associated with the fault 134. The rate of deceleration 408 can be higher for a more severe fault (e.g., a fire in the interior, a collision). This can occur when the vehicle 102 may not have time to pull out of the driving lane 402. The rate of deceleration 408 can be lower for a less severe fault (e.g., engine smoke) where, for example, the vehicle 102 may have time to pull out of the driving lane 402. Accordingly, the vehicle computing system 108 can be improved to locally determine and select a stopped position of the vehicle 102, as well as the manner in which the vehicle 102 reaches the stopped position. As such, the vehicle computing system 108 can locally tailor its actions to the circumstances of the fault. As indicated above, this can increase user safety, while reducing potential latency issues. In some implementations, one or more system(s) on-board the vehicle 102 can determine a deceleration time delay 409. The deceleration time delay 409 can be indicative of a time period for which to delay a start of the deceleration of the vehicle 102 and/or a time period until the vehicle 102 is to reach a stopped position. For example, the vehicle 102 may be travelling through an intersection. One or more system(s) on-board the vehicle 102 can determine that the vehicle 102 should delay deceleration of the vehicle 102 until after the vehicle 102 has cleared the intersection (e.g., such that the vehicle 102 does not reach a stopped position in the intersection).

Returning to FIG. 1, in some implementations, at least one action can include communicating with one or more remote computing device(s) to help address the fault 134. For instance, the computing device(s) 110 can send data 152 indicative of a request for a confirmation of the existence of the fault 134 to one or more remote computing device(s) that are remote from the vehicle 102 (e.g., to the operations computing system 104). For example, in the event that the user 136 reports a fault 134 (e.g., via user input 150), the computing device(s) 110 can request that a human operator of the service provider confirm an existence of the fault 134 (e.g., by reviewing images of the vehicle's interior). In the event the fault 134 is not confirmed or is untrue, the service provider can penalize a user (e.g., a repeatedly untruthful user) for a false report. This can include a monetary penalty, decreased user rating, and/or other type of penalty applied to the user's account, profile, etc.

Additionally, or alternatively, the computing device(s) 110 can provide data 153 indicative of a request for maintenance of the vehicle 102. The data 153 can be provided to one or more remote computing device(s) that are remote from the vehicle 102. For example, the computing device(s) 110 can provide the data 153 to the operations computing system 104, requesting that the service provider deploy a maintenance team to the vehicle 102 (e.g., for roadside maintenance). The computing device(s) 110 can also, or alternatively, request that emergency authorities (e.g., ambulance) be deployed to the vehicle 102.

In some implementations, one or more of the action(s) can include requesting a different vehicle to provide the vehicle service to the one or more user(s) 136. For example, in the event that the vehicle 102 is not in condition to provide the vehicle service to a current user 136, the computing device(s) 110 can request that a different vehicle 170 be assigned to the user(s) 136. The computing device(s) 110 can provide, to the operations computing system 104, data 154 indicative of a request for the different vehicle 170 to provide the vehicle service to the one or more user(s) 136. As such, the operations computing system 104 can assign a different vehicle 170 to the user(s) 136. The different vehicle 170 can then travel to the user(s) 136 to provide the vehicle service accordingly.

As indicated above, to pacify a current user 136 of the vehicle 102, the computing device(s) 110 can coordinate one or more communication(s) with the user. In some implementations, the computing device(s) 110 can provide data 156 indicative of a request for a human operator (e.g., associated with the service provider, emergency services) to communicate with a current user 136 of the vehicle 102. The human operator can communicate with the current user 136 via at least one of the display devices and the audio output devices (e.g., speakers) associated with the vehicle 102. In this way, the computing device(s) 110 can provide assistance to a user that may be in need, frightened, confused, frustrated, etc.

Figure 6:
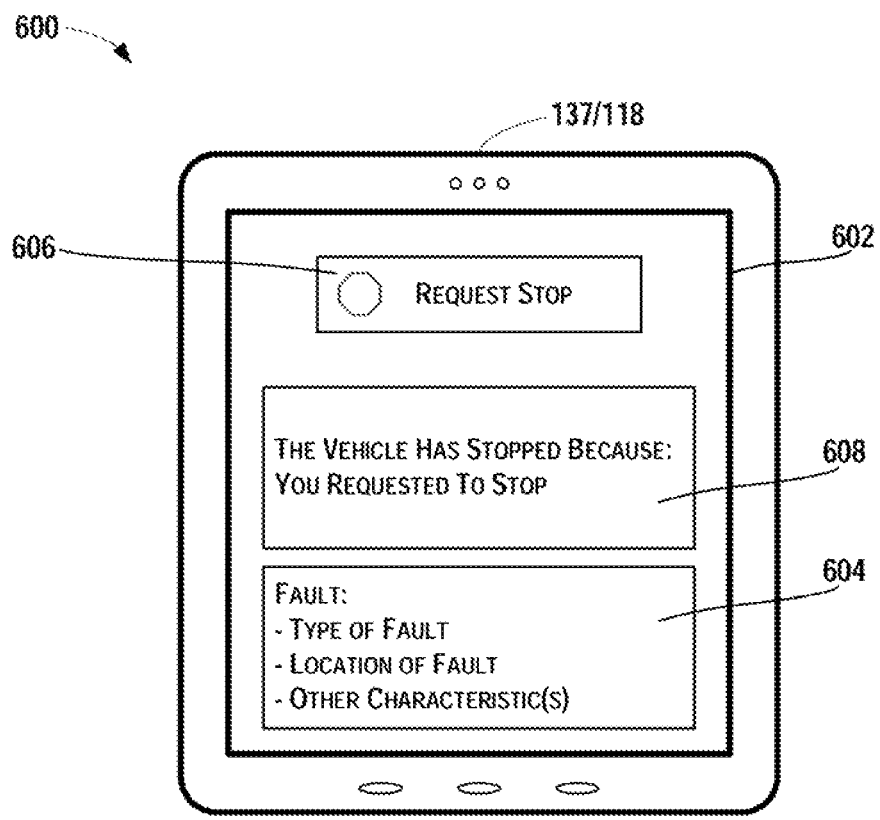
FIG. 6 illustrates an example user interface displayed via a display device according to example embodiments of the present disclosure.

In some implementations, the one or more action(s) can include informing one or more user(s) of the fault 134. The computing device(s) 110 can provide the user 136 with contextual information associated with the fault 134 and/or why the vehicle 102 is taking certain actions (e.g., to stop, to travel to a maintenance location). For instance, FIG. 6 illustrates an example user interface 600 displayed via one or more display device(s) 602 according to example embodiments of the present disclosure. The display device(s) 602 can be associated with a user device 137 (e.g., mobile phone) associated with the user 136 and/or with the human machine interface system(s) 118 (e.g., a tablet in the vehicle's interior). The user interface 600 can be configured to receive and/or present various data to and/or from the user 136. For example, the computing device(s) 110 can provide data 604 indicative of the existence of the fault 134 and/or one or more characteristic(s) 138 of the fault 134 for display via the one or more display device(s) 602.

In some implementations, the user interface 600 can include a user interface element 606 that is displayed via the display device(s) 602. The user 136 can interact with the element 606 to provide a user-initiated request to stop the vehicle 102 (e.g., due to a user's health concern). The computing device(s) 110 can obtain parameter(s) indicative of such user input. The computing device(s) 110 can provide for display (e.g., via the one or more display device(s) 602) data 608 indicative of the request to stop the vehicle 102.

Figure 7:
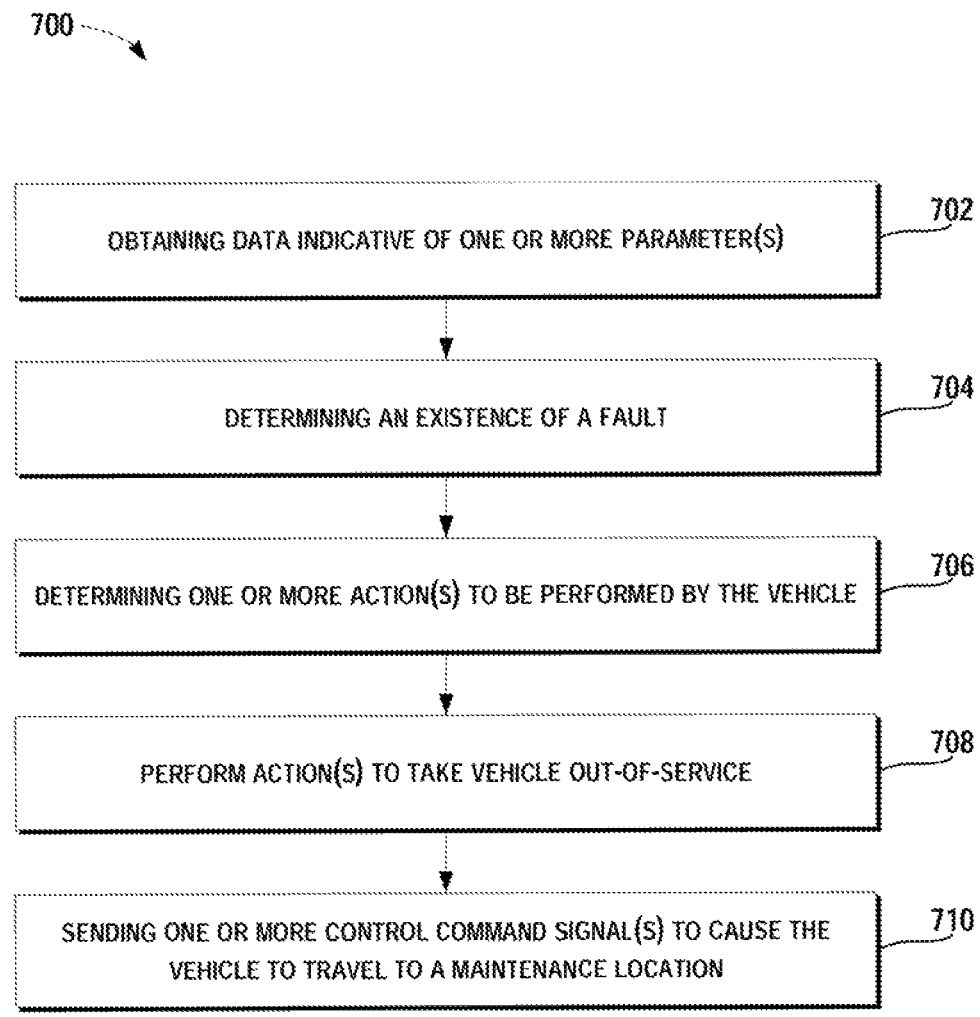
FIG. 7 depicts a flow diagram of an example method of taking a vehicle out-of-service according to example embodiments of the present disclosure.

FIG. 7 depicts a flow diagram of an example method 700 of taking a vehicle out-of-service according to example embodiments of the present disclosure. One or more portion(s) of the method 700 can be implemented by one or more computing device(s) such as, for example, the computing device(s) 110 shown in FIGS. 1 and 10. Moreover, one or more portion(s) of the method 700 can be implemented as an algorithm on the hardware components of the device(s) described herein (e.g., as in FIGS. 1 and 10) to, for example, take a vehicle out-of-service. FIG. 7 depicts elements performed in a particular order for purposes of illustration and discussion. Those of ordinary skill in the art, using the disclosures provided herein, will understand that the elements of any of the methods (e.g., of FIGS. 7-9) discussed herein can be adapted, rearranged, expanded, omitted, combined, and/or modified in various ways without deviating from the scope of the present disclosure.

At (702), the method 700 can include obtaining data indicative of one or more parameter(s). For instance, the one or more computing device(s) 110 on-board the vehicle 102 can obtain data 132 indicative of one or more parameter(s) (e.g., 202A-C) associated with the vehicle 102. The parameter(s) 202A-C can reflect a variety of information associated with the vehicle 102, as described herein. For example, the parameter(s) 202A-C can include at least one parameter 202A indicative of a fuel level of the vehicle 102, at least one parameter 202B indicative of a charge level of an energy storage device on-board the vehicle 102, and/or at least one parameter 202C indicative if an amount of available data storage on-board the vehicle 102 (e.g., in one or more on-board memory device(s)).

As described herein, the vehicle 102 associated with data indicative of the one or more parameters obtained at (702) can be an autonomous vehicle that is configured to provide a vehicle service (e.g., transportation, courier, delivery, of the like of the service provider) to one or more user(s) 136 of the vehicle service. For instance, the vehicle 102 can be included in a plurality of vehicles 103 associated with a service provider (e.g., in a vehicle fleet). The vehicle 102 can be associated with a status 105 that indicates whether the vehicle 102 is available or unavailable to provide the vehicle service. For example, the status 105 can be indicative of whether the vehicle 102 is available and/or willing to accept service requests. In some implementations, the vehicle 102 can be paired to one or more user(s) 136 via a service queue 106 associated with the service provider of the vehicle service, as described above. The service queue 106 can identify at least a subset of a plurality of vehicles 103 that are available to provide the vehicle service.

At (704), the method 700 can include determining an existence of a fault. For instance, the computing device(s) 110 can determine an existence of a fault 134 associated with the vehicle 102 based, at least in part, on the one or more parameter(s) 202A-C associated with the vehicle 102. For example, the computing device(s) 110 can compare at least one of the parameter(s) (e.g., 202C) associated with the vehicle 102 to a threshold (e.g., 204C).

Figure 8:
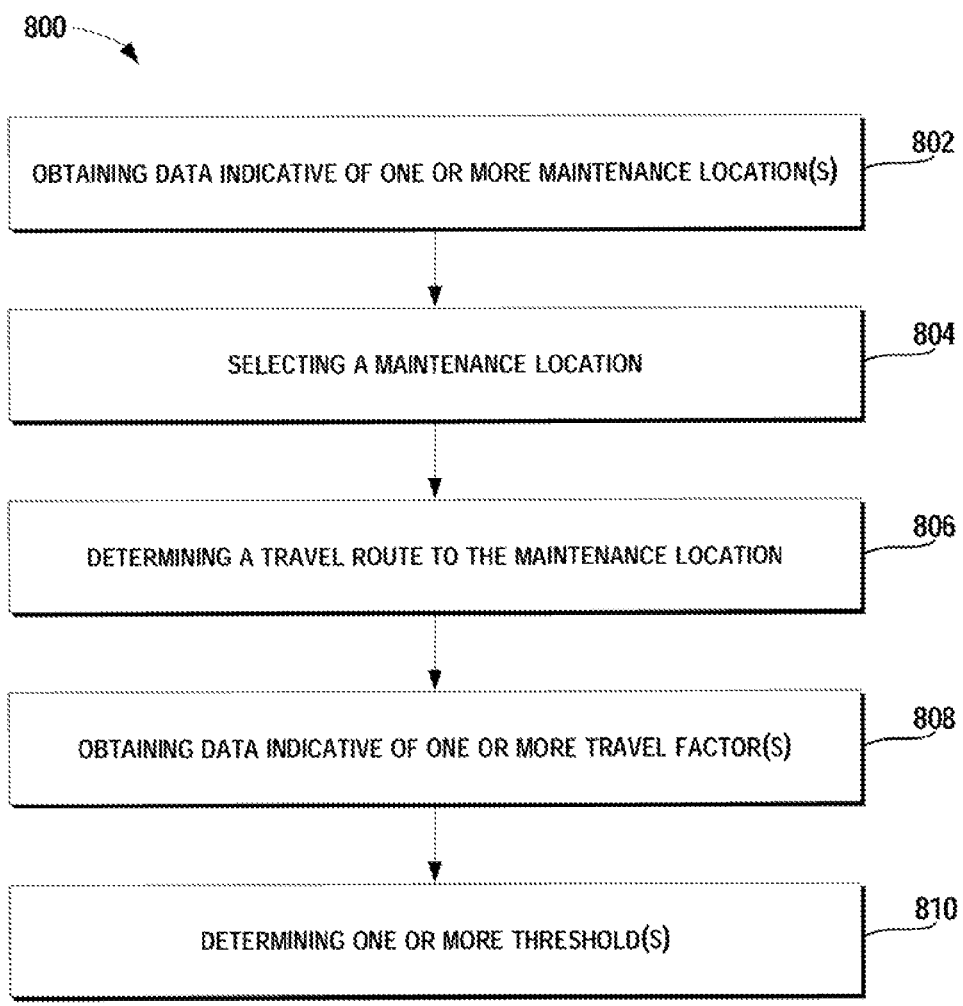
FIG. 8 depicts a flow diagram of an example method of determining a threshold according to example embodiments of the present disclosure.

FIG. 8 depicts a flow diagram of an example method 800 of determining a threshold according to example embodiments of the present disclosure. One or more portion(s) of the method 800 can be implemented by one or more computing device(s) such as, for example, the computing device(s) 110 and/or system 104 shown in FIGS. 1 and 10. Moreover, one or more portion(s) of the method 800 can be implemented as an algorithm on the hardware components of the device(s) described herein (e.g., as in FIGS. 1 and 10) to, for example, determine a threshold. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (802), the method 800 can include obtaining data indicative of one or more maintenance location(s). For instance, the computing device(s) 110 can obtain data indicative of one or more maintenance location(s) 302A-C. The data indicative of the maintenance location(s) 302A-C can be indicative of at least a geographic location(s) (e.g., 306A-C) of each of the respective maintenance location(s) 302A-C. The data obtained at (802) can be indicative of one or more characteristic(s) 304 of each of the maintenance location(s) 302A-C.

At (804), the method 800 can include selecting a maintenance location. For instance, the computing device(s) 110 can select at least one of the maintenance location(s) (e.g., 302C) based, at least in part, on one or more characteristic(s) 304 and/or the geographic location 306C of the maintenance location 302C (and/or the other maintenance locations). As described herein, this may include the maintenance location that is the closest to the vehicle, the maintenance location that is open, etc. At (806), the computing device(s) 110 can determine a travel route 310C to the (selected) maintenance location 302C based, at least in part, on the geographic location 306C of the maintenance location 302C and/or the location (e.g., current, future, destination) of the vehicle 102. Moreover, the computing device(s) 110 can obtain data indicative of one or more travel factor(s) 312 associated with the travel route 310C, at (808). As described herein, the travel factor(s) 312 can include current traffic, historical traffic patterns, predicted traffic, weather, construction, and/or other conditions associated with the respective travel route 310C.

At (810), the method 800 can include determining one or more threshold(s). For instance, the computing device(s) 110 can determine in real-time and/or near real-time a threshold 204A-C based, at least in part, on the travel route 310C and the one or more travel factor(s) 312. A threshold 204A-C can be indicative of a requisite level of at least one parameter 202A-C required for the vehicle 102 to traverse the travel route 310C and to arrive at the geographic location 306C of the maintenance location 302C. For example, a threshold 204C can be indicative of an amount of data storage required for the vehicle 102 to travel to and arrive at the geographic location 306C of the maintenance location 302C (e.g., via the travel route 310C, given the travel factor(s) 312).

Returning to FIG. 7, at (706), the method 700 can include determining one or more action(s) to be performed by the vehicle. The computing device(s) 110 can determine one or more action(s) to be performed by the vehicle 102 based, at least in part, on the existence of the fault 134 as determined at (704).

In some implementations, the action(s) can be determined at (706) based, at least in part, on an operational state 142 of the vehicle 102. For instance, the computing device(s) 110 can determine a level of severity 140 of the fault 134 based, at least in part, on one or more characteristic(s) 138 of the fault 134. The computing device(s) 110 can determine an operational state 142 of the vehicle 102 based, at least in part, on the level of severity 140 of the fault 134. The operational state 142 can be indicative of whether the vehicle 102 is in condition to provide the vehicle service to the user(s) 136. The computing device(s) 110 can determine the one or more action(s) based, at least in part, on the operational state 142 of the vehicle 102. For example, the operational state 142 can indicate that the vehicle 102 is in condition to provide the vehicle service to one or more current user(s) (e.g., current riders) of the vehicle 102. As such, the action(s) can indicate that the vehicle 102 is to complete the vehicle service currently provided to the one or more current user(s) before, for example, taking the vehicle out-of-service.

In some implementations, the operational state 142 can indicate that the vehicle 102 is not in condition to provide the vehicle service. As such, the action(s) determined at (706) can indicate that the vehicle 102 is to cease providing the vehicle service to one or more current user(s). To do so, the vehicle 102 can decelerate to a stopped position, as described herein.

At least one of the actions determined at (706) can include the vehicle 102 travelling to and arriving at a maintenance location 302C. Thus, in some implementations, at (710), the computing device(s) 110 can provide one or more control command signal(s) 144 to one or more system(s) on-board the vehicle 102 (e.g., the autonomy system 114) to cause the vehicle 102 to travel to and arrive at the maintenance location 302C. The system(s) on-board the vehicle 102 can navigate the vehicle 102 (e.g., in a fully autonomous mode) to the maintenance location 302C so that the fault 134 can be addressed.

At (708), the computing device(s) 110 can perform one or more of the action(s) to take the vehicle 102 out-of-service, such that the vehicle 102 is unavailable to provide the vehicle service(s) (e.g., of the service provider). In some implementations, at least one of the action(s) can include adjusting the status 105 associated with the vehicle 102. The computing device(s) 110 can adjust the status 150 associated with the vehicle 102 to indicate that the vehicle 102 is unavailable to provide the vehicle service based, at least in part, on the existence of the fault 134, at (708). In some implementations, the computing device(s) 110 can perform one or more of the action(s) to take the vehicle 102 out-of-service based, at least in part, on the fault by removing the vehicle 102 from a service queue 106 associated with the vehicle 102 and/or otherwise making the vehicle 102 unavailable to provide the vehicle service. For instance, the computing device(s) 110 can provide, to one or more remote computing devices (e.g., of the operations computing system 104) that are remote from the vehicle 102, data indicating that the vehicle 102 is unavailable to provide the vehicle service. The vehicle 102 can be removed from the service queue 106 associated with the vehicle service and/or otherwise designated as unavailable. As described herein, the vehicle 102 may not accept requests for the vehicle service when the vehicle 102 is out-of-service and/or the status 105 associated with the vehicle 102 indicates that the vehicle 102 is unavailable to provide the vehicle service. As such, the vehicle computing system 108 can self-diagnose vehicle faults and take action to address the faults without interference.

Figure 9:
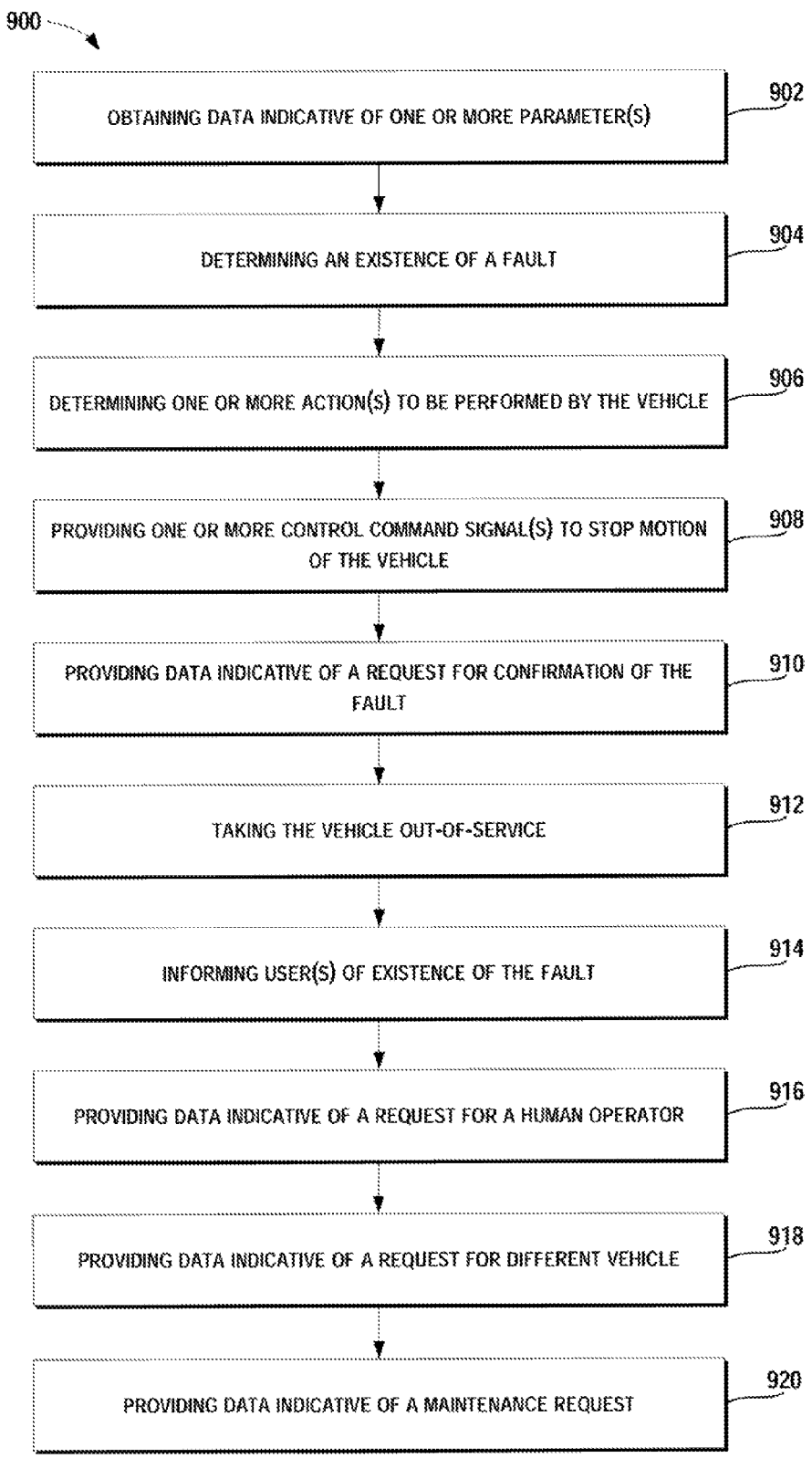
FIG. 9 depicts a flow diagram of an example method of stopping the motion of a vehicle according to example embodiments of the present disclosure.

FIG. 9 depicts a flow diagram of an example method 900 of stopping the motion of a vehicle according to example embodiments of the present disclosure. One or more portion(s) of method 900 can be implemented by one or more computing device(s) such as, for example, the computing device(s) 110 shown in FIGS. 1 and 10. Moreover, one or more portion(s) of the method 900 can be implemented as an algorithm on the hardware components of the device(s) described herein (e.g., as in FIGS. 1 and 10). FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (902), the method 900 can include obtaining data indicative of one or more parameter(s). As described herein, the computing device(s) 110 can obtain data 132 indicative of one or more parameter(s) (e.g., 202A-C) associated with the vehicle 102. In some implementations, the one or more parameter(s) can include data indicative of a user input 150 associated with the fault 134 (e.g., smoke in the vehicle interior). The computing device(s) 110 can determine an existence of a fault 134 associated with the vehicle 102 based, at least in part, on the one or more parameter(s) 202A-C associated with the vehicle 102, at (904). Moreover, at (906), the computing device(s) 110 can determine one or more action(s) to be performed by the vehicle 102 based, at least in part, on the existence of the fault 134, as described herein.

At least one of the action(s) determined at (906) can include stopping a motion 404 of the vehicle 102. Thus, at (908), the computing device(s) 110 can provide one or more control command signal(s) 148 to one or more of the system(s) on-board the vehicle 102 to facilitate stopping the motion 404 of the vehicle 102 in response to the existence of the fault 134. For example, to facilitate stopping the motion 404 of the vehicle 102 one or more of the on-board system(s) (e.g., the autonomy system 114) can determine at least one of a stopped position (e.g., 406, 502), a rate of deceleration 408, and a deceleration time delay 409 for the vehicle 102 based, at least in part, on the fault 134 and one or more travelling condition(s) 405 (e.g., heading, speed, position, location, surroundings) associated with the vehicle 102, as described herein. In some implementations, the stopped position can be in a current driving lane 402 of the vehicle 102. In some implementations, the stopped position can be out of a current driving lane 402 of the vehicle 102.

Moreover, one or more of the on-board system(s) can cause at least a deceleration of the vehicle 102 until the vehicle 102 is in the stopped position (e.g., 406, 502). As described herein, the computing device(s) 110 can determine a level of severity 140 of the fault 134 based, at least in part, on one or more characteristic(s) 138 of the fault 134. The computing device(s) 110 can determine at (906) one or more of the action(s) based, at least in part, on the level of severity 140 of the fault 134. For example, a rate of the deceleration 408 of the vehicle 102 can be based, at least in part, on the level of severity 140 associated with the fault 134.

In some implementations, at least one of the action(s) determined at (906) can include confirming the existence of the fault 134. For instance, at (910), the method 900 can include sending data indicative of a request for confirmation of the fault. The computing device(s) 110 can send data 152 indicative of a request for a confirmation of the existence of the fault 134 to one or more remote computing device(s) that are remote from the vehicle 102 (e.g., to the operations computing system 104). By way of example, in the event that the user 136 reports a fault 134 (e.g., via user input 150), the computing device(s) 110 can request that a human operator of the service provider confirm an existence of the fault 134 (e.g., by reviewing images of the vehicle's interior).

In some implementations, at least one of the action(s) determined at (906) can include taking the vehicle 102 out-of-service. For instance, at (912), the computing device(s) 110 can adjust the status 105 associated with the vehicle 102 to indicate that the vehicle 102 is unavailable to provide the vehicle service. In this way, the vehicle 102 can prevent being assigned to any other service requests before the fault 134 is addressed.

In some implementations, one or more of the action(s) determined at (906) can include informing one or more of the user(s) 136 of the fault 134. For instance, at (914), the method 900 can include informing one or more user(s) of the existence of the fault 134. The computing device(s) 110 can provide data 604 indicative of the existence of the fault 134 and/or one or more characteristic(s) 138 of the fault 134 for display via the one or more display device(s) 602 (e.g., as shown for example in FIG. 6). In this way, the vehicle 102 can provide a user with contextual information regarding the fault 134.

In some implementations, one or more of the action(s) determined at (906) can include facilitating communication with a user 136. For instance, at (916), the method 900 can include sending data indicative of a request for a human operator to communicate with a current user. The computing device(s) can provide data 156 indicative of a request for a human operator (e.g., associated with the service provider, emergency services) to communicate with a current user 136 of the vehicle 102. The human operator can communicate with the current user 136 via at least one of the display devices and the audio output devices (e.g., speakers) associated with the vehicle 102 (e.g., to pacify the user).

In some implementations, one or more of the action(s) can include requesting a different vehicle 170 to provide the vehicle service to the one or more user(s) 136. For instance, at (918), the computing device(s) 110 can provide (e.g., to one or more remote computing devices associated with a service provider) data 153 indicative of a request for the different vehicle 170 to provide the vehicle service to the one or more user(s) 136, as described herein.

In some implementations, one or more of the action(s) determined at (906) can include requesting maintenance for the vehicle 102. For instance, at (920), the computing device(s) 110 can provide data 152 indicative of a request for maintenance of the vehicle 102. The data 152 can be provided to one or more remote computing device(s) that are remote from the vehicle 102. For example, the computing device(s) 110 can provide the data 152 to the operations computing system 104, requesting that the service provider deploy a maintenance team to the vehicle 102 (e.g., for roadside maintenance). The computing device(s) 110 can also, or alternatively, request that emergency authorities (e.g., ambulance) be deployed to the vehicle 102.

Figure 10:
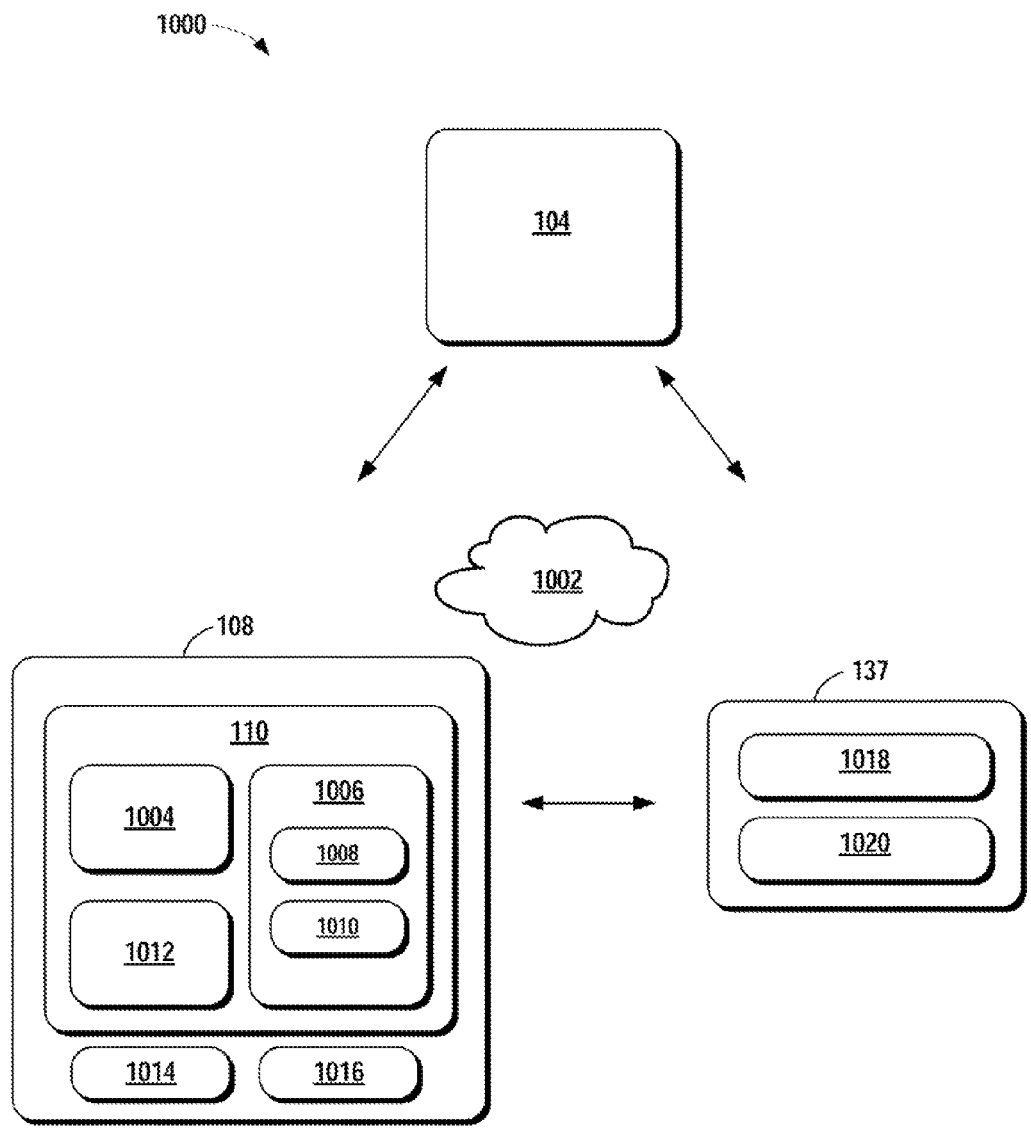
FIG. 10 depicts example components of an example system according to example embodiments of the present disclosure.

FIG. 10 depicts an example system 1000 according to example embodiments of the present disclosure. The system 1000 can include the operations computing system 104, the vehicle computing system 108 (e.g., located on-board the vehicle 102), and one or more user device(s) 137. The operations computing system 104, the vehicle computing system 108, and one or more user device(s) 137 can be configured to communicate via the one or more network(s) 1002 such as those as described herein.

The vehicle computing system 108 can include the one or more computing device(s) 110. The computing device(s) 110 can include one or more processor(s) 1004 on-board the vehicle 102 and one or more memory device(s) 1006 on-board the vehicle 102. The one or more processor(s) 1004 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc. The processor(s) can be a single processor or a plurality of processors that are operatively and/or selectively connected. The memory device(s) 1006 can include one or more non-transitory computer-readable storage media, such as RAM, ROM, EEPROM, EPROM, flash memory devices, magnetic disks, etc., and/or combinations thereof.

The memory device(s) 1006 can store information that can be accessed by the one or more processor(s) 1004. For instance, the memory device(s) 1006 on-board the vehicle 102 can include computer-readable instructions 1008 that can be executed by the one or more processor(s) 1004. The instructions 1008 can be software written in any suitable programming language or can be implemented in hardware. Additionally, or alternatively, the instructions 1008 can be executed in logically and/or virtually separate threads on processor(s) 1004. The instructions 1008 can be any set of instructions that when executed by the one or more processor(s) 1004 cause the one or more processor(s) 1004 to perform operations.

For example, the memory device(s) 1006 on-board the vehicle 102 can store instructions 1008 that when executed by the one or more processor(s) 1004 on-board the vehicle cause the one or more processor(s) 1004 to perform operations such as any of the operations and functions of the computing device(s) 110 or for which the computing device(s) 110 are configured, as described herein, the operations for taking a vehicle out-of-service, determining a threshold, and stopping a motion of the vehicle (e.g., one or more portion(s) of methods 700, 800, 900), and/or any other operations or functions for addressing a vehicle fault, as described herein.

The one or more memory device(s) 1006 can store data 1010 that can be retrieved, manipulated, created, and/or stored by the one or more processor(s) 1010. The data 1010 can include, for instance, data associated with the vehicle 102, data acquired by the data acquisition system(s) 112, map data, data associated with a fault, data associated with user input, data associated with one or more action(s) and/or control command signals, data associated with users, and/or other data or information. The data 1010 can be stored in one or more database(s). The one or more database(s) can be split up so that they are located in multiple locales on-board the vehicle 102. In some implementations, the computing device(s) 110 can obtain data from one or more memory device(s) that are remote from the vehicle 102.

The computing device(s) 110 can also include communication interface 1012 used to communicate with one or more other system(s) on-board the vehicle 102 (e.g., over the network(s) 1002. The communication interface 1012 can include any suitable components for interfacing with one or more network(s), including for example, transmitters, receivers, ports, controllers, antennas, or other suitable hardware and/or software.

The vehicle computing system 108 can also include one or more input device(s) 1014 and/or one or more output device(s) 1016. The input device(s) 1014 and/or the output device(s) 1016 can be included and/or otherwise associated with a human-machine interface system. The input devices 1014 can include, for example, hardware for receiving information from a user, such as a touch screen, touch pad, mouse, data entry keys, speakers, a microphone suitable for voice recognition, etc. The output device(s) 1016 can include one or more display device(s) (e.g., display screen, CRT, LCD) and/or one or more audio output device(s) 1016 (e.g., speakers). The display device(s) and/or the audio output device(s) can be used to facilitate communication with a user. For example, a human operator (e.g., associated with a service provider) can communicate with a current user of the vehicle 102 via at least one of the display device(s) and the audio output device(s).

The user device(s) 137 can be various types of computing devices. For example, the user device(s) 137 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The user device(s) 137 can be associated with a user (e.g., 136). The user device(s) 137 described herein can also be representative of a user device that can be included in the human machine interface system of the vehicle 102.

The user device(s) 137 can include one or more input device(s) 1018 and/or one or more output device(s) 1020. The input device(s) 1018 can include, for example, hardware for receiving information from a user, such as a touch screen, touch pad, mouse, data entry keys, speakers, a microphone suitable for voice recognition, etc. The output device(s) 1020 can include hardware for providing content for display. For example, the output device(s) 1020 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing device(s) remote from the vehicle (e.g., the operations computing system and its associated computing device(s)) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of taking a vehicle out-of-service, comprising:

obtaining, by one or more computing devices on-board an autonomous vehicle, data indicative of one or more parameters associated with the autonomous vehicle, wherein the autonomous vehicle is configured to provide a vehicle service to one or more users of the vehicle service;

determining, by the one or more computing devices, an existence of a fault associated with the autonomous vehicle based at least in pan on the one or more parameters associated with the autonomous vehicle;

determining, by the one or more computing devices, one or more actions to be performed by the autonomous vehicle based at least in part on the existence of the fault; and performing, by the one or more computing devices, one or more of the actions to take the autonomous vehicle out-of-service based at least in pan on the fault, wherein at least one of the actions comprises adjusting a status associated with the autonomous vehicle based at least in part on the fault such that the autonomous vehicle is unavailable to provide the vehicle service.

2. The computer-implemented method of claim 1, wherein the status indicates whether the autonomous vehicle is available or unavailable to provide the vehicle service, and wherein performing, by the one or more computing devices, one or more of the actions to take the vehicle out-of-service comprises:

adjusting, by the one or more computing devices, the status associated with the autonomous vehicle to indicate that the autonomous vehicle is unavailable to provide the vehicle service.

3. The computer-implemented method of claim 2, wherein adjusting, by the one or more computing devices, the status associated with the autonomous vehicle to indicate that the autonomous vehicle is not available to provide the vehicle service comprises:

providing, by the one or more computing devices to one or more remote computing devices that are remote from the autonomous vehicle, data indicating that the autonomous vehicle is unavailable to provide the vehicle service.

4. The computer-implemented method of claim 3, wherein performing, by the one or more computing devices, one or more of the actions to take the autonomous vehicle out-of-service based at least in part on the fault comprises removing, by the one or more computing devices, the autonomous vehicle from a service queue associated with the vehicle.

5. The computer-implemented method of claim 2, wherein the autonomous vehicle does not accept requests for the vehicle service when the status associated with the vehicle indicates that the autonomous vehicle is unavailable to provide the vehicle service.

6. The computer-implemented method of claim 1, wherein determining, by the one or more computing devices, the one or more actions comprises:
   determining, by the one or more computing devices, a level of severity of the fault based at least in part on one or more characteristics of the fault;
   determining, by the one or more computing devices, an operational state of the autonomous vehicle based at least in part on the level of severity of the fault, wherein the operational state, is indicative of whether the autonomous vehicle is in condition to provide the vehicle service; and
   determining, by the one or more computing devices, the one or more actions based at least in part on the operational state of the autonomous vehicle.

7. The computer-implemented method of claim 6, wherein the operational state indicates that the autonomous vehicle is in condition to provide the vehicle service to one or more current users of the autonomous vehicle, and wherein the autonomous vehicle is configured to complete the vehicle service provided to the one or more current users before the autonomous vehicle is out-of-service.

8. The computer-implemented method of claim 6, wherein the operational state indicates that the autonomous vehicle is not in condition to provide the vehicle service.

9. The computer-implemented method of claim 8, wherein the autonomous vehicle is configured to cease providing the vehicle service to one or more current users.

10. The computer-implemented method of claim 1, wherein at least one of the actions comprises travelling to and arriving at a maintenance location, and wherein the method further comprises:
   providing, by the one or more computing devices, one or more control command signals to one or more systems on-board the autonomous vehicle to cause the autonomous vehicle to travel to and arrive at the maintenance location.

11. The computer-implemented method of claim 10, wherein determining, by the one or more computing devices, the existence of the fault associated with the autonomous vehicle based at least in pan on the one or more parameters associated with the autonomous vehicle comprises:
   comparing, by the one or more computing devices, at least one of the parameters associated with the autonomous vehicle to a threshold.

12. The computer-implemented method of claim 11, further comprising:
   obtaining, by the one or more computing devices, data indicative of the maintenance location, wherein the data indicative of the maintenance location is indicative of at least a geographic location of the maintenance location;
   determining, by the one or more computing devices, a travel route to the maintenance location based at least in pan on the geographic location of the maintenance location;
   obtaining, by the one or more computing devices, data indicative of one or more travel factors associated with the travel route; and
   determining, by the one or more computing devices, the threshold based at least in pan on the travel route and the one or more navel factors, wherein the threshold is indicative of a requisite level of the at least one parameter required for the autonomous vehicle to traverse the travel route and to arrive at the geographic location of the maintenance location.

13. A computing system for taking a vehicle out-of-service, the system comprising:
   one or more processors on-board an autonomous vehicle; and
   one or more memory devices on-board the autonomous vehicle, the one or more memory devices storing instructions that when executed by the one or more processors cause the one or more processors to perform operations, the operations comprising:
   obtaining data indicative of one or more parameters associated with the autonomous vehicle, wherein the autonomous vehicle is configured to provide a vehicle service to one or more users of the vehicle service, and wherein the autonomous vehicle is associated with a status that indicates whether the autonomous vehicle is available or unavailable to provide the vehicle service;
   determining an existence of a fault associated with the autonomous vehicle based at least in part on a comparison of the one or more parameters associated with the autonomous vehicle to one or more thresholds;
   determining one or more actions to be performed by the autonomous vehicle based at least in part on the existence of the fault, wherein at, least one of the actions comprises adjusting the status associated with the autonomous vehicle; and
   adjusting the status associated with the autonomous vehicle to indicate that the autonomous vehicle is unavailable to provide the vehicle service based at least in part on the fault.

14. The computing system of claim 13, wherein adjusting the status associated with the autonomous vehicle to indicate that the autonomous vehicle is unavailable to provide the vehicle service comprises:
   providing to one or more remote computing devices that are remote from the autonomous vehicle, data indicating that the autonomous vehicle is to be removed from a service queue associated with the vehicle service.

15. The computing system of claim 13, wherein at least one of the actions comprises travelling to and arriving at a maintenance location, and wherein the operations further comprise:
   providing one or more control command signals to one or more systems on-board the autonomous vehicle to cause the autonomous vehicle to travel to and arrive at the maintenance location.

16. The computing system of claim 15, wherein at least one of the parameters is indicative of an amount of available data storage on-board the autonomous vehicle.

17. The computing system of claim 16, wherein at least one threshold is indicative of a threshold amount of available data storage, and wherein the threshold amount of available data storage is based at least in part on an amount of data storage required for the autonomous vehicle to travel to and arrive at the maintenance location.

18. An autonomous vehicle comprising:
one or more systems on-board the autonomous vehicle;
one or more processors on-board the autonomous vehicle; and
one or more memory devices on-board the autonomous vehicle, the one or more memory devices storing instructions that when executed by the one or more processors cause the one or more processors to perform operations, the operations comprising:
obtaining data indicative of one or more parameters associated with the autonomous vehicle, wherein at least a portion of the data is provided by one or more of the systems on-board the autonomous vehicle,
wherein the autonomous vehicle is included in a plurality of vehicles associated with a service provider, and
wherein the autonomous vehicle is configured to pr vide a vehicle service of the service provider to one or more users;
determining an existence of a fault associated with the autonomous vehicle based at least in part on the one or more parameters associated with the autonomous vehicle; and
performing one or more actions to take the vehicle out-of-service based at least in part on the fault, wherein at least one of the actions comprises adjusting a status associated with the autonomous vehicle based at least in part on the fault such that the autonomous vehicle is unavailable to provide the vehicle service.

19. The autonomous vehicle of claim 18, wherein a computing device associated with the service provider does not provide the autonomous vehicle with one or more requests for the vehicle service when the autonomous vehicle is out-of-service.

20. The autonomous vehicle of claim 18, wherein one or more of the systems on-board the autonomous vehicle comprise one or more image capture devices configured to acquire image data to be used for operation of the autonomous vehicle in an autonomous mode, and wherein the fault is associated with storing the image data.

* * * * *